US00RE38660E

(19) United States
(12) Reissued Patent
Novosel et al.

(10) Patent Number: US RE38,660 E
(45) Date of Reissued Patent: Nov. 23, 2004

(54) SOUND RECORDING AND REPRODUCTION SYSTEM FOR MODEL TRAIN USING INTEGRATED DIGITAL COMMAND CONTROL

(75) Inventors: Michael J. Novosel, Chicago, IL (US); Kelly Boles, Rochester, MN (US); Vincent S. Fleszewski, III, Crown Point, IN (US)

(73) Assignee: Real Rail Effects, Inc., Chicago, IL (US)

(21) Appl. No.: 09/592,461

(22) Filed: Jun. 9, 2000

Related U.S. Patent Documents

Reissue of:
(64) Patent No.: 5,855,004
Issued: Dec. 29, 1998
Appl. No.: 08/851,200
Filed: May 5, 1997

U.S. Applications:
(63) Continuation-in-part of application No. 08/289,257, filed on Aug. 11, 1994, now abandoned.

(51) Int. Cl.[7] ..... A63H 19/14; H02P 7/00
(52) U.S. Cl. ..... 704/272; 105/1.5; 318/51; 704/201
(58) Field of Search ..... 704/272, 201; 105/1.5; 318/51

(56) References Cited

U.S. PATENT DOCUMENTS

| | | | | | |
|---|---|---|---|---|---|
| 3,839,822 | A | * | 10/1974 | Rexford | 446/410 |
| 3,893,107 | A | * | 7/1975 | Schedler | 340/384.3 |
| 4,266,368 | A | * | 5/1981 | Nyman | 446/410 |
| 4,267,551 | A | * | 5/1981 | Dankman et al. | 340/384.3 |
| 4,293,851 | A | * | 10/1981 | Beyl, Jr. | 340/384.72 |
| 4,314,236 | A | * | 2/1982 | Mayer et al. | 340/384.71 |
| 4,325,199 | A | * | 4/1982 | McEdwards | 446/130 |
| 4,335,381 | A | * | 6/1982 | Palmer | 340/825.21 |
| 4,341,982 | A | * | 7/1982 | Lahti et al. | 318/51 |
| 4,524,932 | A | * | 6/1985 | Bodziak | 246/247 |
| 4,572,995 | A | * | 2/1986 | Enami | 388/812 |
| 4,572,996 | A | * | 2/1986 | Hanschke et al. | 388/809 |
| 4,613,103 | A | * | 9/1986 | Waranowitz | 246/473 A |
| 4,914,431 | A | * | 4/1990 | Severson et al. | 340/825.69 |
| 4,946,416 | A | * | 8/1990 | Stern et al. | 446/409 |
| 5,174,216 | A | * | 12/1992 | Miller et al. | 104/296 |
| 5,251,856 | A | * | 10/1993 | Young et al. | 246/4 |
| 5,267,318 | A | * | 11/1993 | Severson et al. | 704/270 |
| 5,341,453 | A | * | 8/1994 | Hill | 388/815 |
| B 5,045,016 | | * | 8/1995 | Stern et al. | 446/409 |
| 5,441,223 | A | * | 8/1995 | Young et al. | 246/4 |
| 5,448,142 | A | * | 9/1995 | Severson et al. | 318/280 |
| 5,773,939 | A | * | 6/1998 | Severson et al. | 318/51 |

OTHER PUBLICATIONS

Jayant, Nikil: "Signal Compression: Technology Targets and Research Directions" *IEEE Journal on Selected Areas in Communications*, vol. 10, No. 5, Jun. 1992, pp. 796–818.*

(List continued on next page.)

*Primary Examiner*—Susan McFadden
(74) *Attorney, Agent, or Firm*—Patents & TMS, P.C.

(57) ABSTRACT

A system is provided for recording, storing and reproducing sound for playing back in an environment requiring simulated sounds, voices, and/or sound effects. Sounds are recorded on a chip and played back in an asynchronous manner from the chip as a result of activation of a switch or inertial movement within the system. A Hall-effect sensor, reed switch or momentary switch or the like may be implemented for enabling activation of the recorded sound from the chip for broadcasting. A compander compresses the sound on the chip and expands the compressed sound for playback. Employing the above system for audio storage, a sound, motor and special effects controller may be created for model train applications as well. The different functions of the sound unit are controlled through a discrete bi-polar digital command control signal using a unique address for each unit. A synchronous means of play back may also be employed when the system is used with the bi-polar signal using a sensor. In addition to the analog sound storage, the same concepts and ideas may be applied to a digital sound recording and play back device as well.

23 Claims, 20 Drawing Sheets

OTHER PUBLICATIONS

NMRA Recommended Practices RP–9.2.1: Extended Packet Formats For Digital Command Control, All Scales, Mar. 1997.*
1993 Walthers Catalog, ROCO HO excerpts, p. 36–44, 49, 52, 52.*
1994 Walthers Catalog, ROCO HO excerpts, p. 62–71, 84.*
1995 Walthers Catalog, ROCO HO excerpts, p. 68, 70–78, 84, 85.*
1996 Walthers Catalog, ROCO HO excerpts, p. 61–69, 86–89.*
1997 Walthers Catalog, ROCO HO excerpts, p. 64–72, 92–95, 216.*
1994 ROCO price list.*
ROCO 1993/1994 Catalog, HO excerpts, p. 4, 5, 52, 234.*
ROCO 1996/1997 Catalog, HO excerpts, p. 4, 5, 35.*
ROCO, Digital is Cool, n.d., p. 36–41, 86, 310, 311.*
Marklin Insider Special Edition 1998: Marklin Digital, p. 2, 7–9, 13–19, 82, 83.*
Rutger Friberg Model Railroad Electronics 2, 1998, excerpts, p. 2, 9, 15, 16, 24, 25, and 57.*
Stan Ames, Rutger Friberg, and Ed Loizeaux, Digital Command Control, 1998, excerpts, p. 16, 17.*
Marklin Price List, Apr. 1987, pp. 1, 4, 5.
Marklin Price List, Feb. 1988, pp. 1, 4.
Marklin Price List, Apr. 1989, pp. 1, 6.
Marklin Price List, Apr. 1990, pp. 1, 5.
Marklin Price List, Jan. 1991, pp. 1, 6.
Marklin Price List, Feb. 1994, pp. 1, 4.
Marklin Web Site downloaded information Aug. 2001 (digital comparison HTML), pp. 1–3.
Marklin Catalog excerpts, 1987/88 E, pp. 4, 7, 10, 11, 15, 16, 17, 24, 25, 26, 27, 29, 30, 31, 100, 101, 166–176.
Marklin Catalog excerpts, 1990/91 E–I, pp. 61, 136–145.
Marklin New Items, 1990, pp. 5, 6, 15.
"Everything Operates Digitally," 1990/91 E, all pages.
Marklin Catalog excerpts, 1991/92 E–I, pp. 99, 190–199, 284, 285, 320, 321, inside back cover.
Marklin Catalog excerpts, 1992/93 E–I, pp. 78–85, 220–229, inside back cover.
Marklin Catalog excerpts, 1993/94 DI (German Text), pp. 28, 30, 32, 33, 45, 219, 225–233, inside back cover.
Marklin Catalog excerpts, 1994/95 E, pp. 16, 22, 180,181, 229, 234–243, 325, 330, 332, 338, 339, 345, 347, 349, 379, inside back cover.
Marklin Catalog excerpts, 1995/96 E, pp. 10, 284–293, 382–385, 406, 407 inside back cover.
Marklin Catalog excerpts, 1997/98 E, pp. 384, 385, 418, 435, 437, 439, 447, 451, inside back cover.
Puckett, "Model Railroading Takes a Look At DCC Decoder Installations," *Model Railroader*, pp. 32–38, Oct. 1997.
Kelly, "DCC: What It Is and What It Does," *Model Railroading*, pp. 88–89, Nov. 1997.
Mansfield, "Installing Digital Command Control on a Home Layout Part 2: I Await With Baited Breath," *Model Railroading*, pp. 50–54, Dec. 1997.
Pitts, "DCC: Digital Command Control," *N–Scale*, pp. 30–34, Nov./Dec. 1997.
Smith, "Diesel Engine Sound Effects Generator," *Model Railroader*, pp. 87–88, Mar. 1982.
Hansen, "Symposium Correction," *Model Railroader*, p. 171, Nov. 1982.
Hansen, "July Symposium Correction," p. 105, Nov. 1981.
McGhee, "Correction," *Model Railroader*, p. 109, Mar. 1981.
Montague, "Your Top Tips Ho–Scale Bachman Oil Storage Tank with a Horn," *Railmodel Journal*, p. 57, Jul. 1992.
Sprout, "ISD Sound Chips," *Railroad Model Craftsman*, p. 12, Nov. 1993.
Hansen, "Diesel Horn Problems," *Model Railroader*, p. 94, May 1987.
Hansen, "Source for Sound Generator ICS," *Model Railroader*, p. 106, May 1984.
Hermanson, "DCC Forum," *Railroad Model Craftsman*, pp. 6–7, Apr. 1996.
"Trade Topics—New Products—Built and Tested by MR's Staff—Steam Locomotive Sound System," *Model Railroader*, pp. 12–13, Jan. 1970.
Puckett, "Dallee's Newest Sound Releases," *ModelRailroader*, p. 17, Nov. 1997.
Sound Traxx, Sound Traxx Owners and Tech Manual and Diesel Addendum.
Atkinson, "Electronics Symposium Refrigerator Sound Circuit," *Model Railroader*, p. 127, Nov. 1997.
Hansen, "Sound Effects Chip," *Model Railroader*, p. 113, Nov. 1980.
Product Window, *Model Railroader*, p. 65, Dec. 1978.
Gil Mille, "What is the SOUND/LIGHT UNIT?" *Railroad Model Craftsman*, pp. 30–33, Mar. 1962.
Brewster, "Superdealing a Pacific Coast Shay Part 3," *Model Railroader*, pp. 76–82, Oct. 1983.
Atkinson, "Waterfall Sound," *Model Railroader*, pp. 118–119, Feb. 1990.
Atkinson, "Sounds," Green Frog Tape, *Model Railroader*, p. 105, May 1991.
Atkinson, "Mechanical Refrigerator Car Sound," *Model Railroader*, pp. 112–114, Aug. 1991.
Hediger, "HO Scale Mechanical Refrigerator Sound Unit," *Model Railroader*, pp. 112–114, Aug. 1991.
Atkinson, "Opamp Horn," *Model Railroader*, p. 138, Nov. 1991.
Thompson, Fyfee Electronics Instructions Inquiry, *Model Railroader*, p. 131, Oct. 1992.
Thompson, MR Workshop—Command Control Standards, *Model Railroader*, p. 25, Oct. 1994.
Gutierrez, "Life–like SD7 Command Control Light Problems," *Model Railroader*, pp. 30, 34, Jan. 1996.
Atkinson, "Electronics Symposium World Wide Web Sites of Interest," *Model Railroader*, p. 109, Aug. 1996.
Russinger, "Hobby Shop Counter Sound Traxx," *NMRA Bulletin*, p. 14, Jan. 1997.
Hansen, "CTC–16 Transformer Discontinued," *Model Railroader*, p. 81, May 1986.
Ames and Lord, e–mail messages of statements made to Patent and Trademark Office.
Ames, Letters to Patent and Trademark Office, Aug. 20, 1999.
Lord, Letter to Mattson, Esq. with enclosures, Aug. 19, 1999.
PSI, Dynatrol Mini Instructions, Jun. 1999.
"N Scale," *NMRA Bulletin*, p. 13, Jan. 1995.
Product Review, *Finelines*, p. 4, May 1971.
Schleicher, "Two Train Ctonrol With Two Wires," *Model Railroading*, pp. 48–53, Oct. 1980.
"Operation: Carrier/Command–Control Revisited," *Model Railroading*, pp. 34–36, Jan. 1983.

Kalambach, 34 Electronics Projects, pp. 45–54, 64–71.
Kalambach, *Model Railroad Electronics*, pp. 68–75.
Koester, "Trans of Thought—The Power of Sound," p. 121, *Model Railroader*, May 1999.
Goodenough, "IC Holds 16 Seconds of Audio Without Power," *Electronic Design*, Jan. 31, 1999.
"Magisk rostmodul for tag," pp. 18–20, *Allt om Hobby*, Jun. 1992.
"Magisk rostmodul for tag," pp. 23–27, *Allt om Hobby*, Mar. 1992.
Keller Engineering, "Onboard Locomotive Sound & Control System," p. 64, *Model Railroader*, Oct. 1983.
Tried and True Trains Website, NMRA Standard S–9.1, "DCC Electronical Standard," Aug. 1994.
Tried and True Trains Website, NMRA Standard S–9.2, "DCC Communications Standard," Aug. 1994.
Stephans, "Rail Project Research, Railroad Noise," *Model Railroading*, p. 77, May 1990.
Hansen, "Electronics Symposium Correction," *Model Railroader*, p. 148, Oct. 1982.
Freiberg, *Model Railroad Electronics*, pp. 38–39, 46–67.
Alt OM Hobby, *Digital Command Control*, pp. 58, 63, 70–72, 116–117, 122–123.
Portland Blue Book DCC NMRA 94.
Keller, Keller Instruction Update.
Keller, Keller Diesel/Steam KE 1990 Addendum.
Keller, DH84 Addendum.
CVP, Rail Command.
Marklin, Marklin Instructions, Jan. 1, 1991.
"Hear the Telegrapher," *Model Railroader*, p. 37, Aug. 1953.
"Railroad Sounds," *Railroad Model Craftsman*, pp. 22–23, Sep. 1958.
Chaudiere, "Authentic Sound in Locomotives," *Model Railroader*, pp. 33–34, May 1959.
Baker, "Diesel Horn Works on a Dry Cell," *Model Railroader*, pp. 38–40, Apr. 1964.
Sherry, "Railroad Sound Recordings," *Railroad Model Craftsman*, pp. 26–27, Mar. 1966.
Chaudiere, "Whistle, Bell, Steam, and Exhaust Sounds," *Model Railroader*, pp. 44–48, May 1966.
Vogt, "The Monster Diesel Horn,"*Model Railroader*, pp. 50–51, Dec. 1966.
Sohl, "Simple Soundmaker for Model Railroaders," *Model Railroader*, pp. 56, 58, Apr. 1967.
Grande, "Magic Diesel Horn," *Model Railroader*, pp. 56–58, Apr. 1969.
Armstrong, "Realistic Sound And Scale, Part 1," *Model Railroader*, pp. 59–62, Jul. 1969.
Armstrong, "Realistic Sound And_Scale, Part 2," *Model Railroader*, pp. 61–66, Aug. 1969.
Cook, "Tender Speaker for Noise Effects," *Model Raildroader*, pp. 62–63, Jan. 1971.
"Sounds for Geared Locomotives," *Railroad Model Craftsman*, pp. 33–35, Jan. 1972.
Larson, "The Digitrack 1600," *Model Railroader*, pp. 37–40, Aug. 1972.
Brewster, "A Spriced–Up Heisler," *Model Railroader*, pp. 66–73, Feb. 1973.
Stevens, Correction to Schematic Drawing in Nov. 1981 Symposium to the Diesel Engine Sound–Effect Generator, *Model Railroader*, Oct. 1973.
Langley et al., "Top Performance and Sound From a Shay," *Model Railroader*, pp. 46–49, Nov. 1973.
Chaudiere, "Echoes Add to Sound Effects," *Model Railroader*, pp. 42–43, Dec. 1973.
Glaab, "Add a Tape Recorder Input to your PFM Sound System," *Railroad Model Craftsman*, pp. 58–59, Apr. 1976.
"The Case for Radio Control," *Railroad Model Craftsman*, pp. 30–33, May 1976.
Hediger, "Ho Diesel Sound System," *Model Railroader*, pp. 35–36, May 1977.
Thorne, "Action Crossing: Lights Flash, A Diesel Horn Blows, and a Bells ring," *Model Railroader*, pp. 79–82, Jul. 1977.
Lambert Associates, "Ho Sound System," *Model Railroader*, pp. 33–34, Aug. 1977.
Miller, "Simplified Steam Exhaust system," *Railroad Model Craftsman*, pp. 74–75, Oct. 1977.
North, "Upgrading Your Sound System, Part 1," *Gazette*, pp. 48–50, Jan./Feb. 1978.
North, "Upgrading Your Sound System, Part 2," *Gazette*, pp. 47–49, May/Jun. 1978.
EuDaly, "Supersonic–frequency A.C. to Power Lights and Sound Systems," *Railroad Model Craftsman*, pp. 27–33, Nov./Dec. 1978.
North, "Upgrading Your Sound System, Part 3," *Railroad Model Craftsman*, pp. 27–33, Nov./Dec. 1978.
Rakiecz, Jr., "A Sound (?) Idea," *Model Railroader*, pp. 103–106, Apr. 1979.
Dressler, "Whistle Handle of for the Fyfee Electronics Steam sound Generator," Jun. 1979.
North, "An Auxillary 'sound' Car," *Gazette*, pp. 32–33, Sep./Oct. 1979.
Sperandeo, "Commercial Command Control Systems," *Model Railroader*, p. 80–81, Nov. 1979.
Cassler, "Action for Diesels," *Railroad Model Craftsman*, pp. 64–68, Nov. 1979.
Findley, "Improved Sound–System Keying," *Railroad Model Craftsman*, pp. 104–105, Nov. 1979.
Gutierrez, "Introducing the CTC–16: A 16–Channel Command Control System You Can Build, Part 1," *Model Railroader*, pp. 64–67, Dec. 1979.
Gutierrez, "Introducing the CTC–16: A 16–Channel Command Control System You Can Build, Part 2," *Model Railroader*, pp. 86–93, Jan. 1980.
Gutierrez, "Introducing the CTC–16: A 16–Channel Command Control System You Can Build, Part 3," *Model Railroader*, pp. 89–92, Feb. 1980.
Gutierrez, "Introducing the CTC–16: A 16–Channel Command Control System You Can Build, Part 4," *Model Railroader*, pp. 89–93, Mar. 1980.
Gutierrez, "Introducing the CTC–16: A 16–Channel Command Control System You Can Build, Part 5," *Model Railroader*, pp. 71–77, Apr. 1980.
Sperandeo, "Command Control Comparison," *Model Railroader*, pp. 90–95, Apr. 1980.
Gutierrez, "The CTC–16: Epilogue," *Model Railroader*, pp. 132–136, Dec. 1980.
Hansen, "Symposium on Electronics," *Model Railroader*, pp. 74–75, Jul. 1981.
Smallshaw, "Upgrading a Varney Dockside," *Model Railroader*, pp. 70–71, Feb. 1981.
Hansen, "Symposium on Electronics," *Model Railroader*, pp. 87–90, May 1981.
Taylor et al., "Installing CTC–16 Receivers in Powered Diesel Units," *Model Railroader*, pp. 72–77, Sep. 1981.

Keller Engineering, "Command Control/Sound System," *Model Railroader*, pp. 48–54, Dec. 1981.
"Power Pack Performance Tests: Five Carrier/Command–Control Systems," *Model Railroader*, pp. 41, 43, 45, 47, 49 and 51, Apr. 1982.
Hansen, "Symposium on Electronics," *Model Railroader*, pp. 82–83, May 1982.
Hansen, Syposium on Electronics, *Model Railroader*, pp. 86–87, Sep. 1982.
Keller Engineering, *Keller Steam Kit*, 1983.
Sperandeo, "Wiring the Washita & Santa Fe," *Model Railroader*, pp. 90–95, Sep. 1982.
"Command Control System," *Model Railroader*, pp. 33–35, Sep. 1982.
Johannsen, "Onboard," *Gazette*, pp. 66–67, Sep./Oct. 1982.
Joesten, "Bilingual Locomotive," *Railroad Model Craftsman*, pp. 98–99, Jan. 1983.
Hansen, "Symposium on Electronics," *Model Railroader*, pp. 116–116, Jan. 1983.
Chubb, "Command Control Comes to the Sunset Valley," *Model Railroader*, pp. 103–109, Jan. 1983.
Konrad, "Dynatrol," *Gazette*, pp. 56–58, Mar./Apr. 1983.
Kosinski, "Carrier Control by–Pass Switch," *Railroad Model Craftsman*, Mar. 1983.
Hansen, "Symposium on Electronics," *Model Railroader*, pp. 80–82, May 1983.
Power Systems Inc., "Dynatrol Low–Profile receiver," *Model Railroader*, May 1983.
Kelly, "Zero 1 for N Scale," *Model Railroader*, pp. 62–65, Jul. 1983.
North, "Installing Sound in the Grandt Porter," *Gazette*, pp. 53–55, Jul./Aug. 1983.
Hansen, "Symposium on Electronics," *Model Railroader*, Aug. 1983.
Hansen, "Symposium on Electronics," *Model Railroader*, pp. 16–117, Nov. 1983.
Keller Engineering Instruction Manual, "Onboard Locomotive Sound & Control System," pp. 1–89, Jan. 1984.
Keller Engineering, "Control Keypad," *Model Railroader*, pp. 42c–42d, Feb. 1984.
Hansen, "Symposium on Electronics," *Model Railroader*, pp. 96–98, Feb. 1984.
At the Throttle, "Command Control: An Update," *Model Railroader*, p. 57, Mar. 1984.
Furlow, "Wiring the San Juan Central," *Model Railroader*, pp. 66, 68–70, Mar. 1984.
Brown, "Momentary Contact Sound Cam," *Gazette*, pp. 48–49, Mar. 1984.
Gutierrez, "The CTC–16e: The Next Generation of Command Control," *Model Railroader*, pp. 85–90, Apr. 1984.
Gutierrez, "Building the CTC–16e: 2," *Model Railroader*, pp. 84–91, May. 1984.
Gutierrez, "Building the CTC–16e: 3," *Model Railroader*, pp. 68–72, Jun. 1984.
Gutierrez, "Building the CTC–16e: 4," *Model Railroader*, pp. 66–71, Jul. 1984.
Gutierrez, "Building the CTC–16e: Conclusion," *Model Railroader*, pp. 88–93, Aug. 1984.
Burgess, Layout Sound Effects: The Fourth Dimension, *Model Railroader*, pp. 88–93, Out. 1984.
Hansen, "Symposium on Electronics," *Model Railroader*, pp. 128–130, Nov. 1984.
Dorsam, "Command Control . . . Is the Wiring Really All that Easy?," *NMRA*, Dec. 1984.
Chubb, "The C/MRI: A Compter/Model Railroad Interface," *Model Railroader*, pp. 92–97, Feb. 1985.
Hansen, Symposium on Electronics, *Model Railroader*, pp. 100–101, May 1985.
Keller Engineering, "Command Control Throttle and Sound System," *Model Railroader*, pp. 36–37, Aug. 1985.
Hansen, "Symposium on Electronics," *Model Railroader*, pp. 82–83, Aug. 1985.
Hediger, "Mr. Workshop," *Model Railroader*, pp. 110, 119–120, 122, Sep. 1985.
Markovich, "Making Sound Cams Quickly," *Gazette*, pp. 2–23, Sep./Oct. 1985.
Trammell, "PMP–112: Introduction," *Railroad Model Craftsman*, pp. 73–77, Mar. 1986.
Trammell, "PMP–112: Receivers," *Railroad Model Craftsman*, pp. 70–77, Apr. 1986.
Trammell, "PMP–112: Steam Sound," *Railroad Model Craftsman*, pp. 77–84, Jun. 1986.
Wright, "Carrier/Command–Control for N Scale: Dummy Diesels to House the Receivers," *Model Railroader*, pp. 23–25, Jul. 1986.
Dorsam, "More Thoughts on Command Control," *Gazette*, 1987.
Hansen, "Symposium on Electronics," *Model Railroader*, pp. 111–115, Feb. 1987.
Hansen, "Symposium on Electronics," *Model Railroader*, pp. 88–89, Aug. 1987.
Kamm, "CTC80 Command Control," *Model Railroader*, pp. 84–87, Mar. 1988.
Trammell, "Phase II PMP–112 Receiver," *Railroad Model Craftsman*, pp. 86–88, Apr. 1988.
Trammell, "Phase II PMP–112 Sound System," *Railroad Model Craftsman*, pp. 74–75, May 1988.
Trammell, "Phase II PMP–112 Power Module," *Railroad Model Craftsman*, pp. 65–70, Jun. 1988.
Hansen, "Symposium on Electronics," *Model Railroader*, pp. 94–96, May 1988.
Trammell, "PMP–112 Diesel Sound Module," *Railroad Model Craftsman*, pp. 65–69, Aug. 1988.
Robson, "A Sound Idea," *Railroad Model Craftsman*, pp. 94–96, Dec. 1988.
Atkinson, "Symposium on Electronics," *Model Railroader*, Feb. 1989.
Gutierrez, "Build and Authentic Diesel Horn for Your Railroad," *Model Railroader*, pp. 106–115, Feb. 1989.
Burgess, "Locomotive Whistles on the Yosemite Valley RR," *Model Roalroader*, pp. 68–69, Jul. 1989.
Thompson, "Wireless Walkaround Control for the Cat Mountain & Santa Fe," *Model Railroader*, pp. 67–71, Aug. 1989.
Märklin, Inc., "2–Rail Digital DC for N Gauge, HO Gauge and #1 Gauge," 1990.
Starr Enterprises, Inc., "Sound Center," *Model Railroader*, pp. 66–68, Jan. 1990.
Joiner et al., "Wireless Cab Control for the Great Southern," *Model Railroader*, pp. 92–95, Jan. 1990.
Atkinson, "Symposium on Electronics," *Model Railroader*, May 1990.
Dorsam, "Some Thoughts on Wiring Your Model Railroad," *NMRA Bulletin*, p. 13, Oct. 1990.
Gutierrez, "The SDX–1, A Diesel Sound system You Can Build—Part 1," *Model Railroader*, pp. 88–93, Feb. 1991.
Gutierrez, "The SDX–1, A Diesel Sound system You Can Build—Part 2," *Model Railroader*, pp. 126–130, Mar. 1991.

Gutierrez, "The SDX–1, A Diesel Sound system You Can Build—Part 3," *Model Railroader*, pp. 102–105, Apr. 1991.
Gutierrez, "The SDX–1, A Diesel Sound system You Can Build—Part 4," *Model Railroader*, pp. 111–114, May 1991.
Gutierrez, "The SDX–1, A Diesel Sound system You Can Build—Part 5," *Model Railroader*, pp. 92–96, Jun. 1991.
Roberts, "You've Never Heard It So Good: Making Digital Recordings For Your Layout," *Railroad Model Craftsman*, pp. 89–92, Oct. 1991.
Hediger, "Sound and Command Control System," *Model Railroader*, pp. 62–64, Oct. 1991.
Roberts, "You've Never Heard It So Good: Part II: Two–Part Playback," *Railroad Model Craftsman*, pp. 94–96, Nov. 1991.
Ames, "Proposed NMRA Electrical Standard for Command Control: Status Report," *The Columbus Clinics*, pp. 131–139, Oct. 1992.
Roberts, "You've Never Heard It So Good: Part III: Additional Features and Applications," *Railroad Model Craftsman*, pp. 89–93, Jan. 1992.
Kendall, "Electronics—Background Sound," *N–Scale*, pp. 58–60, Jan./Feb. 1992.
Roberts, "You've Never Heard It So Good: Part IV: Multiple Chips," *Railroad Model Craftsman*, pp. 94–95, Feb. 1992.
Atkinson, "Symposium on Electronics," *Model Railroader*, p. 108, Feb. 1992.
Chaudiere, "More Punch From the ISD 1016," *Railroad Model Craftsman*, p. 81, Apr. 1992.
Wood, "Radio Remote Control for PFM Sound Systems," *Model Railroader*, pp. 77, 79, 81, Dec. 1992.
Ames, "Command Control: The Next Generation," *The Clinics at Valley Forge*, pp. 1–10, 1993.
Thompson, "The ABC's of Command Control," *Model Railroader*, pp. 104–107, Jun. 1993.
"What's New . . . From the NMRA," *Railroad Journal*, p. 54, Jul. 1993.
J.B., "Sound and Poser," *CTT*, p. 34, Jul. 1993.
Thompson, "Command Control Roundup," *Model Railroader*, pp. 88–93, Jul. 1993.
Ames et al., "Should We Have a Standard for Command Control," *Model Railroad*, pp. 29–32, Aug. 1993.
Dorsam, "More Thoughts on Command Control," *NMRA Bulletin*, p. 29, Sep. 1993.
Ames et al., "New Standards Proposed for Command Control," *Model Railroader*, pp. 104–105, Oct. 1993.
Ames, "Overview of NMRA Digital Command Control Standards," *NMRA Bulletin*, pp. 12–17, Oct. 1993.
Sperando, "Steam Whistle," *Model Railroader*, p. 42, Oct. 1993.
Sperando, "Standards for Command Control?," *Model Railroader*, p. 65, Oct. 1993.
Garlett, "Command Control: The Debate and The Future," *Railroad Model Craftsman*, pp. 134–135, 137, Nov. 1993.
"Diesel Sound System and Throttle," *Model Railroader*, pp. 51–52, 59, Nov. 1993.
"Steam Whistle," *Model Railroader*, pp. 38–39, 1994.
"Diesel Horn," *Model Railroader*, pp. 46–47, 1994.
Zana et al., "Digital Command Control: The Wave of the Future," *Portland*, pp. 219–229, 1994.
West, "A Selection Guide For Digital Command Control," *Portland*, pp. 246–254, 1994.
"Infrared Control System Combines Sound, Throttle, and Turnout Functions," *Model Railroader*, pp. 48–51, Feb. 1994.
Ames et al., "Standards for Digital Command Control," *NMRA Bulletin*, pp. 24–30, Feb. 1994.
Loizeaux, "Digital Command Control Standards: A Non–Technical Discussion," *NMRA Bulletin*, pp. 40–42, Apr. 1994.
"Entry–Level Command Control System," *Model Railroader*, pp. 40–41, Jun. 1994.
Palmiter, "Your Top Tips," *Railmodel Journal*, p. 21, Sep. 1994.
Puckett, "Digitrax 'Challenger'—Entroy–Level Command Control Made in America," *Model Railroader*, pp. 11–13, Sep. 1994.
Puckett, "What is DCC and What Can It Do For Me," *Model Railroader*, p. 64, Sep. 1994.
"Steam and Diesel Sound Generator," *Model Railroader*, p. 40, Nov. 1994.
Hediger, "Digital Plus Command Control Conforms to NMRA Standard," *Model Railroader*, p. 32–33, Nov. 1994.
Thompson, "Workshop," *Model Railroader*, p. 30, Dec. 1994.
"Smart Controller for Command Control," *Model Railroader*, p. 64, Jan. 1995.
Puckett, "Digitrax's DT200—Hand–held Computer Throttle," *Model Railroading*, p. 16–17, Jan. 1995.
Wilson, "Power Pack With Sound and Constant Lighting Units," *Model Railroader*, pp. 59–60, Jan. 1995.
"QSI Sound Bloxx," *Model Railroader*, pp. 43–44, Feb. 1995.
"N Scale Command Control," *Model Railroader*, Feb. 1995.
Puthoff, "Electronics CTC Command Control," *N–Scale*, pp. 40–42, Mar./Apr. 1995.
Kendall, "Electronics—Diesel Train Horn," *N–Scale*, pp. 51–55, Mar./Apr. 1995.
Atkinson, "Using Sound Chips On Your Layout," *Model Railroader*, pp. 118–119, May 1995.
"Diesel Sound System," *Model Railroader*, p. 39, Jun. 1995.
Watson, "Digitrax Decoder Installation," *N–Scale*, pp. 58–59, Jul./Aug. 1995.
K.T., "SystemOne Command Control System," *Model Railroader*, pp. 42–44, Aug. 1995.
J.W., "Steam Sound System," *Model Railroader*, p. 39, Sep. 1995.
Puckett, "Model Railroading Takes a Closer Look at Digital Command Control," *Model Railroading*, pp. 18–22, Sep. 1995.
Puckett, "EasyRamp—The Easy Way to Program DCC Decoders," Sep. 1995.
Wilson, "Digitrax Big Boy Digital Command Control System," *N–Scale*, p. 44–45, Sep./Oct. 1995.
Puckett, "Model Railroading Takes a Closer Look at Digital Command Control—Part II," *Model Railroading*, pp. 38–39, Oct. 1995.
Bonham, "Computers and the Modeler, 5.0," *Railroad Model Craftsman*, pp. 72–74, Oct. 1995.
Sperandeo, "Command Control Today," *Model Railroader*, p. 69, Oct. 1995.
Puckett, "Model Railroading Takes a Closer Look at Digital Command Control—Part III," *Model Railroading*, pp. 33–35, Nov. 1995.
Loizeaux, "A DCC Discussion," *Railroad Model Craftsman*, pp. 82–85, Nov. 1995.
Puckett, "WinLok 2.0 Brings New Functionality to DCC," *Model Railroading*, p. 57, Dec. 1995.

Puckett, "Planning a System to Meet Your Needs," *Model Railroading*, pp. 27–29, Dec. 1995.
Puckett, "Software Updates and DCC on the Web," *Model Railroading*, p. 46, Jan. 1996.
"Steam and Diesel Sound System," *Model Railroading*, pp. 50–54, Jan. 1996.
Puckett, "Visit the Cumbres and Toltec on CD," *Model Railroading*, pp. 52–53, Feb. 1996.
Bacus, Jr., "Observation Car," *NMRA Bulletin*, p. 11, Feb. 1996.
Gruber, "The Reading Lines Goes DCC," *NMRA Bulletin*, pp. 19–21, Feb. 1996.
Puckett, "Model Railroading Takes a Closer Look at Digital Command Control—Part V," *Model Railroading*, pp. 34–37, Mar. 1996.
Schaumburg, "DCC?," *Railroad Model Craftsman*, pp. 110–111, Apr. 1996.
Puckett, "Programming DCC Decoders with Digitrax's PR1," *Model Railroading*, p. 62, Apr. 1996.
Verner, "A Carload of Sound," *Model Railroader*, pp. 88–89, Jun. 1996.
Barry, "Sound for Layouts," *Mainline Modeler*, pp. 58–60, Jul. 1996.
Puckett, "Model Railroading's Continuing Look at Digital Command Control—Part VI," *Model Railroading*, pp. 10–12, Jul. 1996.
"What you Need to Know About DCC," *Railroad Model Craftsman*, pp. 80–81, Jul. 1996.
Johnston, "In Command of Control," *Railroad Model Craftsman*, pp. 82–84, Jul. 1996.
Loizeaux, "What You Need to Know About DCC," *Railroad Model Craftsman*, pp. 76–80, Jul. 1996.
Martin, "SystemOne DCC System: All Scales," *Model Craftsman*, pp. 89–93, Jul. 1996.
"Sound for N Scale Layout," *N–Scale*, pp. 43–45, Jul./Aug. 1996.
Freitag, "Dynatrol Infrared Wireless Throttle," *Model Railroader*, Sep. 1996.
Ames, "How Compatible DCC?," *Model Railroader*, pp. 92–93, Oct. 1996. SoundTraxx DCC DSD.
Sebastian–Coleman, "Steam Sound System for Digital Command Control and Conventional DC," *Model Railroader*, pp. 41–43, Oct. 1996.
Cabrall, "Installing DCC Decoders in Small Steam Locomotives," *Railroad Model Craftsman*, pp. 71–72, Oct. 1996.
Mansfield, "DCC and the JWRR," *Model Railroading*, pp. 49–50, Oct. 1996.
Ames, "How Compatible Is DCC?," *Model Railroader*, pp. 92–93, Oct. 1996.
Puckett, "Model Railroading Takes a Look at What's New in DCC for 1997," *Model Railroading*, pp. 38–43, Nov. 1996. Part VII.
Goslett, "Digital Command Control System: All scales," *Railroad Model Craftsman*, pp. 95, 104, 106, 108, Jan. 1997.
Sperandeo, "Good News in Chicago," *Model Railroader*, p. 79, Jan. 1997.
Wilson, "MRC's New Command 2000 Digital Command Control Is An Easy–to–Use System," *Model Railroader*, pp. 36–37, Feb. 1997.
Gutierrez et al., "The EasyDCC Command Control System: 1," *Model Railroader*, pp. 86–93, Feb. 1997.
Edwards, "Digitrax Chief Digital Command Control System: All scales," *Railroad Model Craftsman*, pp. 98, 100, 102–103, Feb. 1997.
Sperandeo, "Digital Command Control You Can Build," *Model Railroader*, p. 69, Feb. 1997.
Gutierrez et al., "The EasyDCC command Control System: 2," *Model Railroader*, pp. 84–89, Mar. 1997.
Gutierrez et al., "The EasyDCC Command Control System: 3," *Model Railroader*, pp. 80–85, Apr. 1997.
Puckett, "Model Railroading Takes a Look at DCC Decoder, Part VII," *Model Railroading*, pp. 38, 41, May. 1997.
Gutierrez, "The EasyDCC Command Control System: 4," *Model Railroader*, pp. 94–102, May 1997.
Puckett, "WinLok 1.5 Brings Your Computer Into the Train Room," *Model Railroading*, p. 50, Mar. 1995.
J.D.H., "Diesel Sound System," *Model Railroader*, pp. 39–40, Jun. 1995.
"Ballast Lamps and Power Sections for DCC," *Railroad Model Craftsman*, p. 78, Sep. 1995.
Providenza, "Ballast Lamps and Power Sections for Digital Command Control," *Railroad Model Craftsman*, p. 77, Sep. 1995.
Trammell, "PMP–112: Steam Sound," *Railroad Model Companion*, pp. 77–84, Jun. 1986.
Hansen, "Symposium on Electronics," *Model Railroader*, pp. 80–81, May 1983.
Hansen, "Symposium on Electronics," *Model Railroader*, pp. 116–117, Jan. 1983.
Hansen, "Symposium on Electronics," *Model Railroader*, pp. 116–119, Nov. 1983.
Puckett, "Model Railroading Takes a Look at DCC Decoder Installations," *Model Railroading*, pp. 34–39, Aug. 1997. Part IX.
Gutierrez et al., "The EasyDCC Command Control System: 6," *Model Railroader*, pp. 94–96, Jul. 1997.
Hediger, "Walkaround Throttle for MRC Digital Command Control System," *Model Railroader*, pp. 37–38, Jun. 1997.
Gutierrez, "The EasyDCC Command Control System: 5," *Model Railroader*, pp. 82–89, Jun. 1997.
Puckett, "Model Railroading Takes a Look at DCC Decoders Part VIII," *Model Railroading*, pp. 38–43, May 1997.
Sebastian–Coleman, "DCC–Compatible Onboard Sound System," *Model Railroader*, pp. 39–40, Jul. 1997.
Sebastian–Coleman, "Transformer Case and Power Supply," *Model Railroader*, pp. 43–44, Feb. 1998.
Kellner, "Wiring the Wisconsin Central," *Model Railroader*, pp. 112–115, Dec. 1997.
Thompson, "Running Trains with Computers," *Model Railroader*, pp. 108–109, Oct. 1997.
"Digital Command Control Decoder with Steam Sound," *Model Railroader*, p. 36, Sep. 1997.
Edwards, "DCC Lighting for a Dash–9," *Railroad Model Craftsman*, pp. 48–51, Jul. 1997.
Mansfield, "Installing Digital Command Control on a Home Layout," *Model Railroading*, pp. 66–69, Nov. 1997.
Puckett, "Model Railroading Takes a Look at DCC Decoder Installations," *Model Railroading*, pp. 31–34, Nov. 1997 Part XI.
G.S.C., "Load–Compensating DCC Decoders," *Model Railroader*, pp. 39–40, Sep. 1997.

* cited by examiner

104
OUTPUT LINES 5-8
A
103
IC2
93C46/56/57/66
EEPROM
CS
CLK
DI
DO
VCC
NC
DRG
VSS
+5V OUTPUT LINES
105
1-4
B
C
D
E
F
G
H
I
102
XTAL1
C5
C6
+V-UNREG
Q3
Q5
FILTER NETWORK
MOT1 + MOTOR
Q6
Q4
HALL EFFECT SYNC SENSOR
112
107
J
J3
J4
J5
D1
R3
LED1
K
L
M
OPTO1
H11L2Q
N
O
+V-UNREG
1.5 BRIDGE
BR1
J2
F1
F2
AC
AC
C1
P
Q
QUICK BLOW
PICO FUSES
R

A
B
C
D
E
F
G
H
I
OUT1
OUT2
OUT3
OUT4
VCC
XTAL
XTAL
IN1
IN2
OUT5
OUT6
OUT7
OUT8
GND
OUT9
OUT10
OUT11
IN3
IC1
Z86E08
101
Q2
R2
J6
+V-UNREG
1 FUNCTION #0
2 FRONT LIGHT
3
4 REAR LIGHT
FUNCTION #1
Q1
R1
IC3
/164
QA
QB
QC
QD
QE
QF
QG
QH
A
B
CK
CLR
+5V
106
J1
110
111
+5V
R4
J
K
L
M
N
DCC
C7
108
+5V
+12V
109
O
MC7812CT
VR1
+12V
MC7805CT
VR2
+5V
P
IN
OUT
GND
C2
IN
OUT
GND
C3
C4
Q
R

A
B
C
D
E
F
G
H
I
J
K
L
M
N
O
+5V
2MM CONN.
J7
202
R15
10K E
1
2
3
4
5
6
7
8
9
10
/EDM
+5V
11
12
/CE
+12V
13
14
203
15
16
JUMPER TO DECODER/
POWER SUPPLY
+5V POWER DOWN RESET
A6 A7
PD = L 0 0
PD = L 1 0
PD = L 0 1
PD = H 1 1
R14
10K E
POWER-DOWN
2N3906
Q3
2N3906
Q4
15pF
C18
206
A6
A7

SOUND RECORDING AND REPRODUCTION SYSTEM FOR MODEL TRAIN USING INTEGRATED DIGITAL COMMAND CONTROL

Matter enclosed in heavy brackets [ ] appears in the original patent but forms no part of this reissue specification; matter printed in italics indicates the additions made by reissue.

RELATED APPLICATION DATA

This application is a continuation-in-part of U.S. patent application Ser. No. 08/289,257, filed on Aug. 11, 1994, now abandoned.

BACKGROUND OF THE INVENTION

The present invention generally relates to a modular device, system and method for storing, playing back and recording audio data. More specifically, the present invention relates to a modular device, system and method for reproducing audio data, such as voice and sound effects in a realistic manner.

It is, of course, generally known to generate simulated sounds in response to external stimuli, such as motion. One common industry in which sound production is often simulated is the model railroad industry. Sounds, such as those made by various animals, such as cows, sheep, pigs, and the like, are often reproduced. These sounds are typically generated in connection with a particular car of a railroad to enhance the interest and realism of the model railroad.

Another example of sounds being generated in conjunction with model trains is the heightened realism attained when used with a steam or diesel locomotive. In the past, when sound features have been controlled in conjunction with a model locomotive, methods other than motion have been used to turn these types of sound effects on and off. Some of these methods have been: DC voltage superimposed upon an AC voltage, magnets, reed switches or Hall effect sensors. The use of radio signals or a carrier control signal superimposed upon an AC or DC voltage have been used as well. Furthermore, a separate controller, which varies either AC or DC voltage or current, was required to control the speed and direction of the model train. There has not been a means to integrate all simulated controllable functions a model train may have into a model locomotive or car.

A need, therefore, exists to realistically reproduce and control sound effects, control model train motors and special effects. This need can be best filled by using a sound unit and Digital Command Control for controlling simulated sounds and simultaneously control propulsion of the model trains. Digital Command Control is a type of control that makes use of a digital bi-polar signal to control model trains. As defined in the NMRA Standards, the National Model Railroad Association baseline, Digital Command Control signal consists of a stream of transitions between two equal voltage levels that have opposite polarity. Alternate transitions are separate binary bits in a transmission stream. The remaining transitions divide each bit into a first part and last part. Use of this format gives the hobbyist the most choices for controlling aspects of a sound unit mounted in a model train as a self contained unit or in a track side structure as a accessory.

An example of a known sound effect producing model railroad car is described in U.S. Pat. No. 5,267,318 to Severson et al. The '318 patent teaches a speech synthesis circuit for playing selected cow voices stored as digital data in an EPROM. In a random mode of operation, a state generator provides a pseudo-random count that is used to select among four different cow voices, one of which is silence. The resulting audio output is perceived as random contented cow sounds. A pendulum motion detector provides an indication of lateral motion of the system. An up/down motion counter maintains a motion count reflecting the level of excitation of the system and the cows. The motion counter increments responsive to motion and decrements gradually in the absence of detected motion. A motion count of at least four invokes a triggered mode of operation in which the counter output is used to select among four different excited cow voices.

In the alternate embodiment of the present invention that uses only the sound reproduction apparatus, its improvement over the '318 patent is that no motion counter, microcontroller or state generator is needed to generate a response to a lateral movement of the sound car. The simple movement of the car is all that is needed to cause a response from the sound memory to play-back simple sound effects.

Previous inventions that have tried to control sound effects for model locomotives have only utilized an electromechanical means to control the synchronized sound functions whereas the present invention controls all aspects using digital control of the following: sound, model locomotive speed, direction and special effects on board. Another known system that relates to model trains is U.S. Pat. No. 5,174,216 to Miller et al. In the '216 patent, there is no means to execute sound effects at the model train enthusiast's discretion or to control speed, direction or other onboard special effects. The '216 patent also utilizes a single chuff sample for all speeds, that is controlled using an opto-sensor to define an on or off state. The opto-sensor simply controls one chuff sound effect no matter at what speed the model locomotive may be traveling. The speed simply determines the rate of the chuff. It cannot select from a set of speed sound effects that give a better simulation of different speeds and [work loads] *work-loads*. The present invention overcomes this deficiency by comparing the on-off rate of the sensor to the digital speed packet. Furthermore, the '216 patent makes use of a limited menu of bell, whistle or horn sound effects that are triggered through the use of a Hall effect and various [combination] *combinations* of magnets that are interpreted by a micro controller. The microcontroller then determines which bell/horn whistle sound effects to play. This system relies upon magnets placed along the model railway at specific points. The '216 patent system does not allow for any random play-back or variance of the predetermined menu of sound effects. The '216 patent relies upon a variable AC or DC voltage to control the frequency of the steam chuff or the amplitude of the diesel throb. The previously mentioned variable track voltage is also used to supply current to the sound reproduction circuitry. Because of the variable nature of the power supply for speed control, in order to hear sound effects through all voltage ranges especially in the 0 to 5 volt range, a switchable power supply is needed to change between the track supplied power and a battery back-up contained within the model train locomotive or car.

The '216 patent also is deficient in that it is not able to discretely control sound effects, or regulate the speed of a model locomotive, control direction and other onboard special effects at any random location. The '216 patent is only able to trigger specific sound effects at predetermined locations, and a battery back-up is required for use in all voltage ranges. Because the '216 patent makes use of the variable track supplied power to supply voltage for the circuitry and regulation of the chuff or diesel sound effects, it is unable to operate at slow prototype speeds in a model setting.

There have been attempts at controlling the speed of a model locomotive, sound and special effects to overcome the above deficiencies. One known system that attempted to do this is taught in U.S. Pat. No. 4,914,431. In this patent, the motor controller device is used with AC-powered model trains where typically these types of trains make use of variable AC voltage to control the speed of a locomotive, typically described as "Lionel trains." Furthermore, these types of trains make use of a three-position switch that is controlled by a solenoid to determine forward, neutral or reverse. This unit is called a reverse unit, which the '431 patent is designed to operate exclusively. The scope of the '431 patent is intended to sync the electronic reverse units of a master and slave locomotive. Furthermore, the control system uses state generators for expansion of the remote control effects found on a model locomotive. This is accomplished by simply using a positive and or negative DC digital pulse repeatedly applied to create and to control a plurality of state control signals. Although each motor controller can operate up to sixteen states, only four state generators are enabled for use. This pulse signal is superimposed on the AC motor control supply voltage and can only control one set of special effects per usage. Another deficiency of the '431 patent is that, in its preferred embodiment, only two addresses are possible: a master and a slave. The '431 patent is not designed for multiple locomotives in use in multiple combinations. For the operator of DC powered trains, these deficiencies make the device unsuitable. Finally, this system to control motors and sound effects is a proprietary system and does not inter-operate with any control system other than those for AC-powered trains.

Another known patent that attempts to control speed, sound and special effects in more than two locomotives is U.S. Pat. No. 5,441,223 to Young. In this patent, an RF and an electro-magnetic signal are used in conjunction with a triac to control speed of AC powered locomotives. The triac is modulated and turns the AC power on and off for speed control of the addressed locomotive. This system is designed specifically for "Lionel" brand trains. Reverse compatibility is required to operate previously made AC trains that use the three position reverse unit. As in the '431 patent, the '223 patent uses a switching circuit to control the reverse unit using commands. In a further attempt to preserve reverse compatibility, the '223 patent may still superimpose upon the AC motor control current a DC offset for control of whistle and bell effects on non-receiver equipped locomotives. Due to the need to control the reverse unit and the DC offset, any other type of model trains, that require DC current for motor power cannot use this system. In addition, to the limitation of operating AC powered trains only, the quantity of locomotives the hobbyist may operate with this system is limited to ten. There are additional operational limitations to this system: it requires a hands on approach to access a switch, to place the locomotive in a programming mode, a manual switch needs to be accessed, the inability to tailor locomotive motor performance characteristics such as acceleration and/or deceleration, and inability to tailor sound performance to personal preferences.

There are also three other known U.S. patents that make use of a command control structure for only motor control. One is U.S. Pat. No. 4,572,996 to Hanschke et al. This patent makes use of a Digital Command Control format, but is limited in scope due to its limited address capabilities and the lack of hobbyist programmable features to enhance performance of the locomotives and sound systems. Like the '431 and '223 patents, it is a proprietary system that uses its own protocol. Furthermore, the '996 patent lacks the ability to operate other brands of Digital Command Control receivers which limits it usage.

U.S. Pat. No. 4,335,381 to Palmer makes use of a composite waveform, again demonstrating the proprietary nature of these types of controls. Furthermore, the data portion is a burst that is attached to the back of the waveform that actually powers the devices attached to the controller. This system, although flexible, appears to be limited in its address capabilities due to the method of selecting addresses for each receiver, and the quantity of data bits appears to affect the amount of power available to power motors and ancillary devices. Like the '996 patent, it is limited in its preferred embodiment to speed, direction and inertia.

U.S. Pat. No. 4,341,982 to Lahti et al. makes use of a carrier control signal. This patent uses DC power for propulsion of the model locomotive motor and simply superimposes a selected modulated frequency on top of the DC power. The superimposed control signal is a [band width] *band-width* equal to the highest frequency of the carrier control signal which is equal to the highest selected carrier control address. This system's deficiencies include no easy way to change a locomotives address, limited in [band width] *band-width* for address range, operating characteristics of the motor controller are limited to: direction and deceleration only, and on provisions for additional features to be actuated remotely, such as operation of a sound unit or special lighting effects.

As seen by the above patents, prior art exists; however, each makes use of a proprietary format that only operates each manufacturer's or inventor's devices and are limited in operational characteristics. The present invention, on the contrary, operates across any manufacturer's control systems as long they observe the NMRA digital format now in practice.

The present invention overcomes the above shortcomings by utilizing a micro-controller that decodes a discreet bi-polar digital command directed to its specific address for control of: sound effects, speed regulation, direction of a model locomotive and control of on-board special effects. In addition, the constant voltage supplied to the track is able to supply a constant voltage from a regulated power source to the present invention at all times, no matter what the speed of the model locomotive. In addition to the simple features as outlined, the hobbyist also has access to certain registers that may be used to customize a model locomotive's motor control characteristics and sound features.

The previously mentioned micro-controller uses, in this embodiment, a prescribed packet format that includes speed, direction and accessory/special effects commands. The preferred digital format that is used is dictated by the National Model Railroad Association. By using this format the present invention is able to inter-operate with control systems that are currently on the market and is not dependent on a proprietary control system. However, various digital formats exist for the use of model train control, and the present invention can be adapted to these as well. All aspects of the present invention may be controlled in a "hands-off" manner by executing various addressed commands that are sent on a plurality of tracks as a digital signal to a specific model locomotive. The only limit on this type of invention is the size of the micro-controller and sound memory.

SUMMARY OF THE INVENTION

The present invention can be executed in two configurations, the first uses only the sound reproduction apparatus. The other configuration uses the sound reproduction apparatus and a digital control decoder which is useful when used with model trains that use Digital Command Control.

In the first embodiment, the sound storage and reproduction section of the present invention is used to generate a sound with or without external stimuli, such as being used in a sound-producing, model railroad car. Moreover, the present embodiment provides a system and a method for recording audio data and playing back the audio data in an asynchronous manner. This embodiment provides a simplified means to store and play-back the audio from the sound storage chip. In the preferred embodiment of the present invention an EEPROM is used, that uses Direct Analog Storage Technology (DAST™ by Information Storage Devices) which makes an analog recording of the audio information.

In an alternate embodiment of the sound storage section, the audio is digitized and compressed, and voice synthesis is used as steps in recording the information onto a digital EPROM for use with, for example, but not limited to a Yamaha YM3812 as a sound generator. For play-back, a digital to analog conversion is necessary to convert the digitized information into an analog [wave form] *waveform*. The preferred embodiment of the present invention uses an analog EEPROM that does not require any of these intermediate steps. So the present device simplifies the recording and playback operation for this type of application when used in the preferred embodiment.

Furthermore, by the addition of a microphone to the preferred embodiment, the consumer may add his own voice to the pre-recorded material to tailor the sound effect in some applications through the use of the DAST™ EEPROM that permits recording and re-recording of additional voice or audio effects. This additional voice information may be blocked from overwriting the pre-recorded material on the chip through the use of the multiple address capabilities the DAST™ EEPROM possesses.

When the device is executed in the second configuration using Digital Command Control, the following functions may be accessed and controlled: sound, speed, acceleration, deceleration, direction and any special effects. In a preferred embodiment, a plurality of sound effects are stored on a sound storage device at predetermined addresses that employ DAST™ technology to store an analog sound effect. These same sound effects and principles may also be utilized using a digital type of sound storage chip and a Yamaha YM3812 sound generator, as an example.

An addressed Digital Command Control signal is amplified prior to being placed on the rails to a suitable amplitude to power the sound unit's analog or digital sample memory, integral decoder, power the model locomotive's motor and special effects. Each sound unit uses a discrete address so that it may be independently controlled, and multiple sound units may be in use by the model train operators. Each model train operator controls the following functions of his particular sound unit: all sound functions, model train motor control, and on board special effects.

The present invention makes use of prescribed digital control packets that are addressed to a sound unit's decoder and broadcasted through either two or three model train rails, an overhead track wire or a buss line for reception. The present invention decodes multiple broadcasted digital packets of which one will match the sound unit's preset address. The sound unit activates an appropriate sound, light or other special effect or institutes changes upon motor speed or direction based upon the information contained within the decoded digitally broadcasted packets. The sound effects may be synchronous using the speed packets to determine a sound effect or asynchronous if a bell, whistle/horn or background sound effect is activated. A motor speed packet of zero indicates a stop condition. Any of the sound unit's decoder functions allow sound, motor control or special effects functions to be acted upon by the decoder at any random location around the model train setting and are not limited to predetermined locations. The sound effects may be, but are not limited to, the chuff sound of steam locomotives, blow down, air compressor pumps, generator, bell and whistle. The sounds which emanate from a diesel locomotive: motor throb, turbo charger, dynamic brake grid, air release, bell and horn may also be stored in the sound memory chip.

The motor control aspects of the sound decoder change the speed and direction of the model locomotive based upon information contained within the decoded digital packets. The speed resolution may be expressed as a number of steps which a model locomotive takes to achieve maximum speed from a full stop. A preferred embodiment uses a digital format prescribed by the National Model Railroad Association which currently allows for three different speed resolutions: 14, 28, and 128 speed steps. The greater the number of speed steps in a given resolution, the more precise the motor control will be. The motor control aspects of the sound decoder may act directly upon a properly decoded digital packet and then translate the information contained within the packet into an appropriate speed and direction. Alternately, several registers of the serial EEPROM that the micro-controller can access known as "Control Variables" may be used to modify the information contained within the decoded digital packet prior to the translation into an appropriate speed, direction or for motor noise snubbing for the purpose of motor control. These registers may be fixed in firmware or programmable by the hobbyist. Some examples of these Control Variables, but not limited to, can include acceleration, deceleration, start voltages, motor response curves and motor noise snubbing. These Control Variables allow an end user to tailor a model locomotive's motor operation characteristics to personal preferences, often enhancing the operation of the device.

Certain Control Variables are also reserved for use by the sound aspects of the device. These Control Variables may be fixed in firmware or alternatively programmable by the hobbyist. These Control Variables allow an end user to tailor a model [locomotives's] *locomotive's* sound aspects to personal preferences often enhancing the operation of the device. By utilizing this particular feature, momentum effects may be replicated using steam or diesel sound effects. In addition, the volume may be adjusted remotely from the hand controller. In addition to the sound and motor control aspects, special effects may be controlled. These may be, but are not limited to, lights, different flasher beacons and smoke effects. Each of the sound unit aspects that may be controlled by the model train enthusiast are addressed by specific groups of digital packets for specific sound units. In other words, any of the sounds or types of movement which a real locomotive make are now possible in the model world. The previously mentioned sounds and control of the model locomotive's propulsion may be executed in combinations or in a prescribed method of preference. All of the functions contained within the discretely addressed sound unit or units are accessed through a hand controller provided by a Digital Command Control manufacturer.

The first step in creating the sound effects for the present invention is to record the actual sounds of the animals, sound effects, steam or diesel locomotives. These sounds are mastered and edited for use in either configuration of the present invention. The sound effects that are used in the asynchronous sound module are then simply recorded onto the chip for recall using the enabling means of the Hall effect sensor or other types of sensors. In the Digital Command Control Configuration, the recording of the sound effects [is] *are* accomplished by recording all necessary sound effects from a specific type of the actual locomotive, whether diesel or steam. When a specific diesel locomotive's sound characteristics are recorded and paired to a matching model, the distinct sound characteristics are carried over to the model setting, giving a unique sound to each locomotive. However, steam locomotives vary in driver wheel arrangements and physical size. These two things determine their sound characteristics, so varying the steam locomotive types recorded will give each steam locomotive a distinct sound. So recording the different manufacturers' models gives the hobbyist the ability to pair the correct motor sound to its model instead of simply a generic sound as previously offered. In the Digital Command Control configuration, the recording of the sound effects are accomplished by recording all necessary sound effects from a specific type of actual locomotive for use with a model of the actual locomotive or within a given actual manufacturer's family of locomotives whether diesel or steam. These sound effects are then mastered, and their location in the sound memory is established. Their recall is then accomplished in the Digital Command Control embodiment of the present invention through the following steps using a steam locomotive as an example.

The chuff sound effects of a steam locomotive need to be synchronized with the movement of the steam locomotive's driver wheels. One method to accomplish this task is to utilize the properly decoded digital speed control packets to control a simulated chuff and exhaust sequence which corresponds to the speed of the locomotive. Rather than simply using one generic steam chuff, the chuff of the present invention uses multiple speed recordings of an actual locomotive. These recordings are used at similar speed intervals on the model locomotive so, as the speed increases, there is a change in the frequency and amplitude of the chuff. This is in contrast to the operation of previous sound units for use with model trains which simply reproduced a single chuff sample at different speeds by varying the on (chuff) and off (exhaust) rate according to the voltage applied to the track to set the speed of a model locomotive. Instead of the track voltage controlling a single chuff sample, the chuff on/off rate in the present device could use the DCC signal and the following alternate methods. The single chuff sample would change speed through the use of a variable oscillator controlled by the speed packets producing a corresponding speed sound effect. Or, using a single chuff whose rate is controlled by software stretching or reduce the amount of exhaust between chuffs as done in digital sound editing software. Using the previous two examples, there can be many deviations to the present invention using single or multiple samples to reproduce a corresponding sound effect for recall.

The samples made for the chuff sound effects may also be acquired for the locomotive's air brake pump to simulate different [work loads] *work-loads*. For example, when a steam locomotive is at rest, there are various hissing sounds, and the air pump cycles at a slow rate. However, when the speed of the locomotive increases, the hissing sounds change to a chuff sound. As previously mentioned, the chuff sounds increase in frequency and amplitude in the present invention. As the chuff changes, the air pump cycles increase in frequency as well due to the simulated increase in steam pressure. These same digital packets which contain the information to select an appropriate locomotive sound effect based upon speed packets are also simultaneously used to select the appropriate motor speed for control of both aspects.

In addition to the chuff sounds and air pump, the steam blow down that is a result of stopping a steam locomotive may be represented. This sound effect may once again be an automatic function of the sound unit or under the control of the model train enthusiast. In the automatic mode of control, this type of sound effect is typically triggered by the absence of a properly decoded digital packet. This also can occur upon power-up, during a reset condition, or the decoder sensing a zero speed packet for a stop condition. The other use for this type of effect is to indicate that the broadcasting device is not sending the proper packets. In the case of a stop condition, the blow down effect is triggered for a fixed interval of time and then turns itself off. To activate the effect, a suitably addressed control packet is activated by the hobbyist, and the blow down effect will activate and remain on until the sound effect is switched off. The additional sound effects of the bell and whistle are manually operated by the model train enthusiast. These sound effects are operated in a similar fashion for an actual locomotive, where the bell and whistle have no predetermined sequence of operation, and as long as the button for each sound effect is pressed, it will continue to play. However, the bell and whistle/horn may utilize a programmed sequence for typically used whistle/horn and bell signals. These same types of control methods used for a steam locomotive can be applied to a diesel locomotive as well. The hobbyist also has the option to mute the chuff/motor sound effects by using a function button on the hand controller. This feature, when activated, allows the model train enthusiast to still activate the bell and whistle/horn sound.

An alternate means to synchronize the speed of the chuff is to employ a mechanical, magnetic or electro-mechanical device to allow the micro-controller to sense the revolutions of the locomotive drive axles. A preferred embodiment of the alternate means to synchronize the sound effects to the speed of the model locomotive is to use a Hall effect sensor to sense the rotation of the steam locomotive's drive wheels. This may be accomplished by placing a magnetic strip on the rear of a drive wheel. When the Hall effect senses a change in the magnetic field, it prompts the playback of a chuff sound. The chuff sound effect played back is determined by two factors: the first is the change in the magnetic field to determine the rate of play back, and the other factor is the digital speed packet determining the proper speed sound effect played back from the samples of the different speeds recorded and contained within the analog or digital sound memory.

To this end, in an embodiment, a system is provided for playing back pre-recorded audio and for recording additional sounds by the hobbyist and playing back all recorded sounds. The system has a power source and a sound module means having at least one characteristic sound recorded thereon and operatively connected to the power source. An asynchronous enabling means activates the playback of the at least one characteristic sound from the sound module means. The enabling means actuates the playback upon occurrence of a condition thereby providing a signal to the sound module means.

In an embodiment, the enabling means is a Hall-effect sensor responding to a change in a magnetic field. Further, the system further has a magnet and a pendulum on which the magnet is suspended wherein motion causes the magnet to transpose resulting in the change in the magnetic field.

In an embodiment, the system further has an expanded memory operatively connected to the sound module means.

In an embodiment, the system further has a microphone constructed and arranged for the hobbyist to record the at least one additional characteristic sound directly to the sound module means by the hobbyist.

In another embodiment of the present invention, a model railroad car system is provided including a plurality of cars, at least one of the plurality of cars capable of producing simulated sounds. The system has a power source providing power to the plurality of cars and means for producing sound connected to the power source. The means for producing sound is capable of recording and playing back sounds. An asynchronous activation means is constructed and arranged to provide an enable signal to the means for producing sound resulting in playing back one of the sounds.

In an embodiment, the activation means of the model railroad car system is a magnetically responsive sensor constructed and arranged near a magnetic field wherein the magnetic field may be altered by a magnet.

In an embodiment, the method further has the steps of providing a magnetic source; creating a magnetic field; and providing a magnetic responsive sensing means responsive to changes in the magnetic field to thereby generate the signal.

Another application for the alternate embodiment is a sound reproducing device wherein a microphone may be connected to a consumer device for the home, such as a doorbell or audio-type message pad.

It is, therefore, an advantage of the present invention to create a modular sound recall and play back circuit to adapt to a variety of applications for producing sound.

Still further, an advantage of the present invention is to provide a system and a method to internally activate audio in the first embodiment without the need to externally trigger the at least one sound.

And, another advantage of the present invention is to provide a system and a method to trigger or activate the sound module using the same circuit design.

Another advantage of the present invention is it will decode multiple broadcasted digital packets of which one will match the sound units preset address.

Another advantage of the present invention is that it may see one match for the sound unit's preset address and may activate an appropriate sound, light or other special effect or institute changes upon motor speed or direction based upon the information contained within the digitally addressed and decoded broadcasted packets.

Another advantage is that each model train operator has independent control of the following functions of their particular sound unit: all sound functions, model train motor control, and on-board special effects.

A further advantage is the sound effects may be synchronous using the speed packets to determine a speed sound effect or asynchronous if a bell, whistle/horn or background sound effect is activated for the decoded digital packet.

Another advantage of the present invention is the use of multiple sound samples to emulate the change in speed and [work load] *work-load*.

Another advantage is automatic modes of control for specific sound effects.

Another advantage of the present invention is any of the sound unit's decoder functions, i.e. sound, motor control or special effects functions, may be acted upon by the decoder at any random location around the model train setting and are not limited to predetermined locations.

Another advantage of the invention is the motor control and sound aspects of the sound decoder may be simultaneously acted upon directly when a properly decoded digital packet is translated for the information contained within the packet into an appropriate speed and direction.

Another advantage is the hobbyist has registers in a EEPROM that the micro-controller can access known as "Control Variables" that may be used to modify the information contained within the decoded digital packet to tailor operation to their tastes in the areas of speed, direction, motor noise snubbing and sound functions.

Another advantage is the choice between a menu of whistle/horn or interactive play-back of these types of sound effects.

Another advantage of the present invention is the ability to digitally synchronize sound effects and the speed of the locomotive.

Another advantage of the present invention is to remotely mute or adjust the volume to suit personal preferences.

A further advantage of the present invention is its ability to operate with different Digital Command Control systems that makes use of the NMRA packet format.

These and other advantages of the present invention are described in, and will be apparent from, the detailed description of the presently preferred embodiments and from the drawings.

BRIEF DESCRIPTION OF THE DRAWINGS

FIGS. 5A–5C illustrates a circuit diagram of an embodiment of a portion of the components for generating sounds in response to an enable signal for the system and the method of the present invention.

DETAILED DESCRIPTION OF THE PRESENTLY PREFERRED EMBODIMENTS

Figure 1:
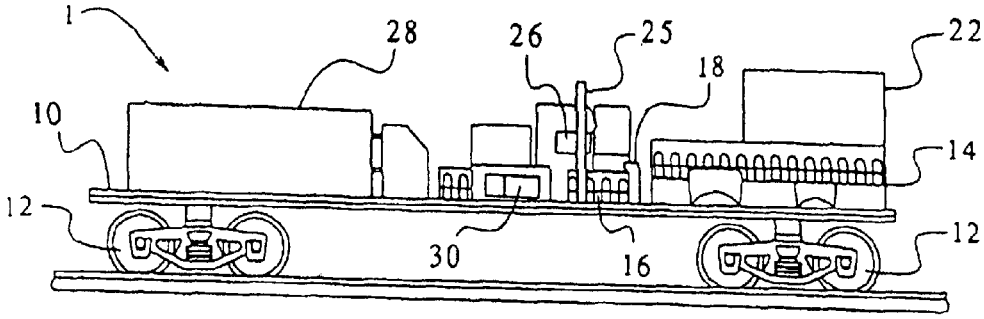
FIG. 1 illustrates a side view of a model railroad car embodying the components required for reproducing sounds with the principles of the first embodiment of the present invention.
Figure 2:
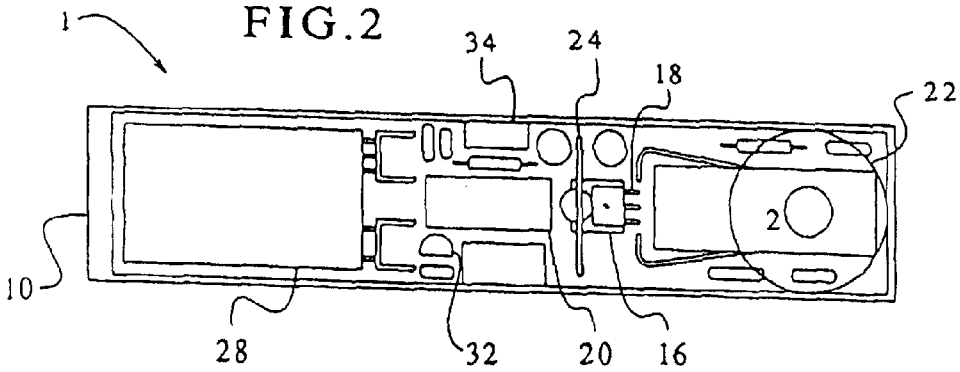
FIG. 2 illustrates a top plan view of an embodiment of the components mounted on a circuit board creating a base of a model railroad car, the components embodying the principles of the present invention for reproducing simulated sounds.

Referring now to the drawings for an embodiment of the present invention, FIGS. 1 and 2 illustrate assembly views of a model railroad car encompassing one embodiment of the present invention. As illustrated in FIG. 1, an exemplary model train car 1 is shown. The model train car 1 includes a platform or base 10 operatively connected to a plurality of wheels 12 as is generally known. The base 10 includes a printed circuit (PC) board for connection of electrical components thereon. Although not illustrated, the electrical components hereinafter described are typically enclosed within a housing such that the model train car 1 encloses the components and provides a decorative appearance in its ordinary usage.

The base 10 includes a PC board for electrical connection of components thereon. One of these components is an analog sound storage processing chip 14 manufactured by, for example, Information Storage Devices (ISD). The processing chip 14 is provided with DAST™ analog memory for storage following recording of various sounds recorded thereon or for subsequent reproduction of the recorded sounds. Connected to the processing chip 14 is an audio amplifier 16 and a sensor 18, such as a Hall-effect sensor as illustrated in FIGS. 1 and 2 having a northern polarity. Of course, other sensors or activators may be implemented. The DAST™ analog storage chip 14 also includes an internal microphone amplifier 38 (FIG. 4) external to or built into the chip 14. The microphone 38 enables recording of additional desired sounds on the chip 14.

An integral part of the sensor 18 includes a non-conductive and non-magnetic pendulum 24 and a magnet 26 suspended above the Hall-effect sensor 18 by a hanger 25. A battery 28, such as a standard nine volt battery, is provided as power for the system. An on-off switch 30 is further provided to activate the system. A regulator 32 is provided to provide five volts of power from the nine volt battery source. Further, a potentiometer 34 is provided to regulate the volume level.

Figure 3:
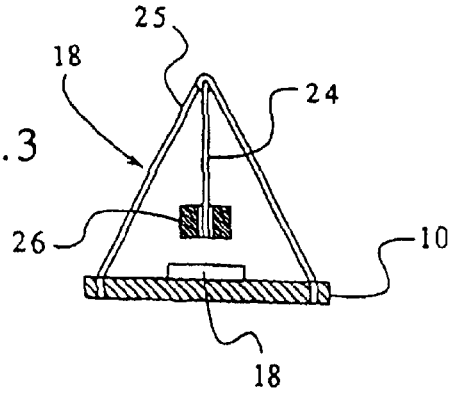
FIG. 3 illustrates a side view of an embodiment of a magnet supported by a pendulum over a sensor for the present invention.

The details of the sensor 18 are more clearly illustrated with reference to FIG. 3. As illustrated in FIG. 3, the sensor 18 includes the hanger 25 supporting the pendulum 24 which swings freely on the hanger 25 with a magnet 26 at the distal end of the pendulum 24 opposite the connection of the hanger 25 to the pendulum 24. The pendulum 24 and the hanger 25 are, in a preferred embodiment, a non-magnetic, non-conducting wire armature. The hanger 25 is mounted to the PC board 10 as illustrated. The magnet 26 swings freely above the Hall-effect sensor 18.

The Hall-effect sensor 18 is operable to produce an enable signal when the object, such as the model train car 1, begins to move. When the movement ceases, the switch remains open until a forward action or a reverse action takes place. The polarity of the magnet 26 and the Hall-effect sensor 18 must match to induce a closure of the switch. That is, the Hall-effect sensor 18 and the magnet 26 must be in alignment. In addition, since the wire armature is constructed of a non-magnetic material, the suspended magnet 26 remains centered above the Hall-effect sensor 18. Therefore, movement in the system creates a disturbance between the Hall-effect sensor 18 and the suspended magnet 26 on the pendulum 24 resulting in production of the enable signal sent to the processing chip 14 to play back the sound recorded thereon.

Figure 4:
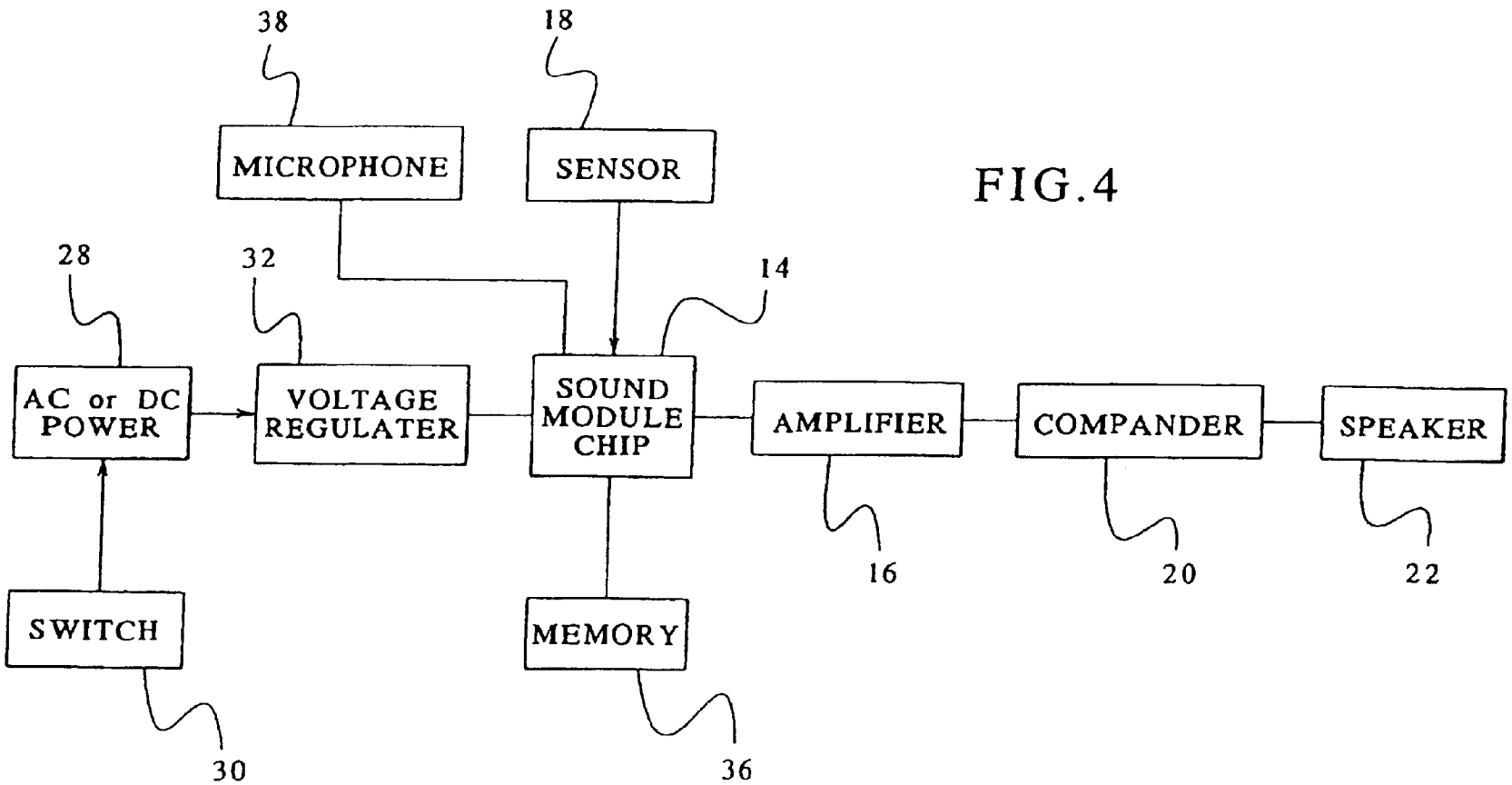
FIG. 4 illustrates a block diagram of an embodiment of the components necessary for implementing the system and method of the present invention.
Figure 5B:
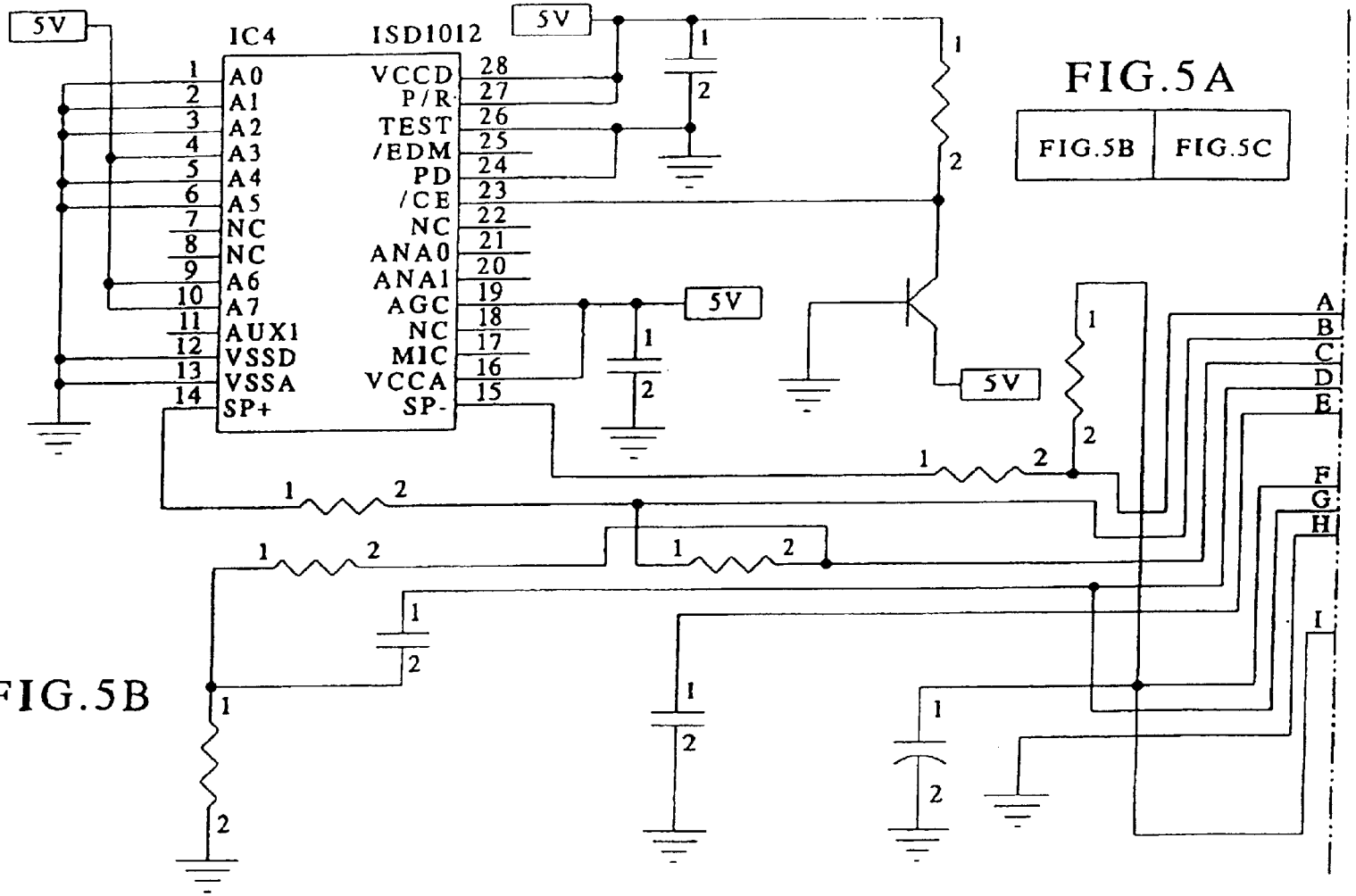
Figure 5C:
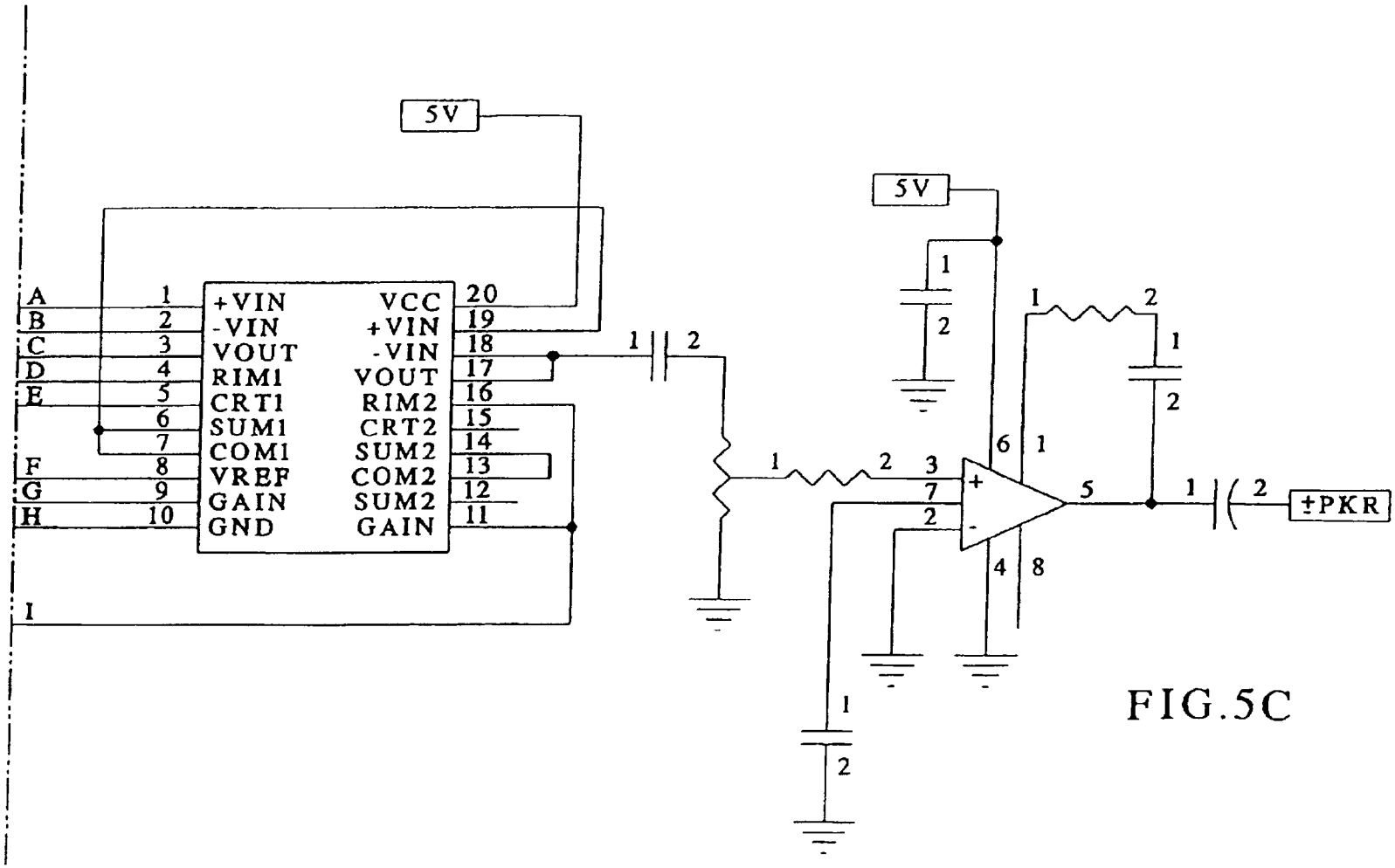
Figure 6:
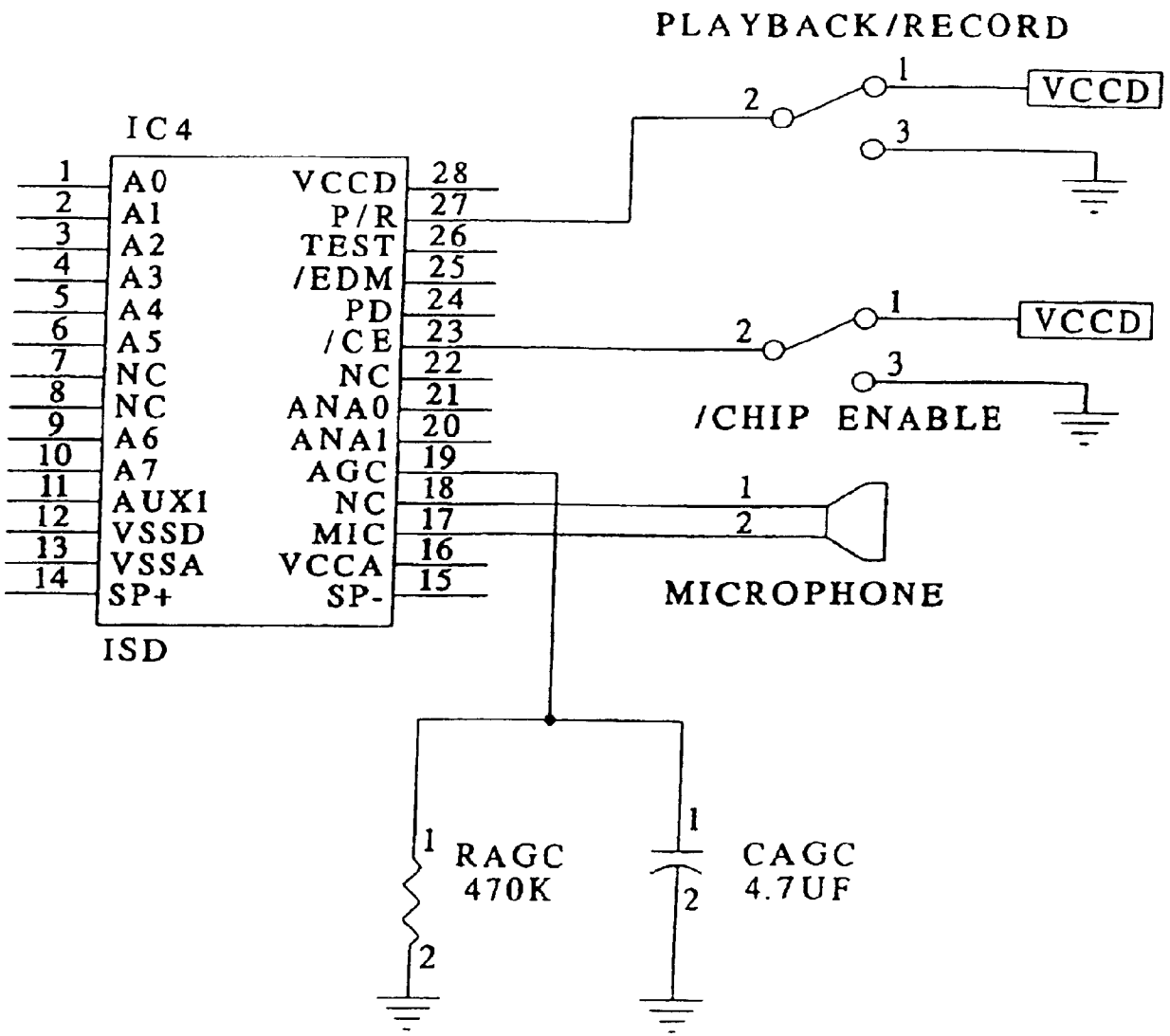
FIG. 6 illustrates a circuit diagram of an embodiment of recording circuitry for the present invention.

FIG. 4 illustrates a diagram of the components in black box format and in schematic diagrams in FIGS. 5 and 6.

Referring to FIG. 4, the power source 28 is activated either on or off by the switch 30. When power is provided to the system, the voltage regulator 32 limits the voltage to the analog processing chip 14 to five volts. The sound module DAST™ analog processing chip 14 is activated by the sensor 18 as previously discussed. The sensor 18 may be a Hall-effect sensor 18.

When any of the sensors or switches are activated, the sound module DAST™ analog chip 14 produces an output which is amplified through the audio amplifier 16 and subsequently passed through the compander 20 and finally to the speaker 22 as an audio output. The sound module analog storage chip 14 further includes internal memory for storing of particular sounds that may be supplemented with additional memory as illustrated at 36 in FIG. 4. The additional memory 36 allows for additional sounds and greater lengths of time for recording sounds on the sound module analog processing chip 14. An external microphone 38 may be connected as an input for recording of sounds on the chip 14. Alternatively, the DAST™ chip 14 is provided with a built-in microphone *input* for recording of sounds thereon.

The present invention will be described with reference to a livestock sound module used with a model railroad car which plays pre-recorded messages when activated, although it should be understood that any environment requiring playback of sound may implement the sound reproducing and recording system of the present invention. Up to six basic components or sections may be implemented to perform the features embodied by the principles of the present invention.

The first section is the power supply previously described. The power supply when used with a model railroad car may run off of track voltage wherein the power is input to a full-wave bridge rectifier and a capacitor acting as a filter. The output is then connected to a voltage regulator. The nine volt DC input from, for example, a nine volt DC battery, is tied in at a node through a diode. If a nine volt battery is used in conjunction with the track power, the battery acts as a low voltage backup keeping the module voltage up when the track voltage drops off or shuts off. Power is switched to the module via the SPST switch.

The second section of the present invention is the DAST™ analog sound effects chip and audio expander. The DAST™ analog sound effects chip is capable of storing between twelve seconds and 120 seconds of analog data in a non-volatile analog memory. Various audio messages can be programmed into the sound effects chip. The library messages are stored on, in a preferred embodiment, a digital [audio tape] *audiotape*. When the messages are programmed, the analog audio signal is played back at a pre-recorded level and sent through a compressor. A compander is used in the present invention which reduces the dynamic range of the signal before it is recorded into the chip. When the sound effects are played back from the chip, they are played back through an audio expander. The expansion does two things: the audio is expanded and the signal is restored to its original dynamic range; and when the audio is expanded, low-level audio noise in the system is attenuated giving an improved signal-to-noise ratio.

The third section of the circuit is the audio amplifier. In a preferred embodiment, the amplifier is an LM386N-1. The output of the audio amplifier is capacitively coupled to a volume potentiometer. The wiper of the potentiometer is the input of the amplifier. The output of the amplifier is capacitively coupled and connected to a speaker.

The fourth section of the circuit is the message activation or chip enabling section of the circuit. Pin 23 of the sound effects chip is the chip enable. Chip enable is an active low signal, and the pin is pulled high with a resistor and a decoupling capacitor in parallel. The configuration of the device initiates the message inside the chip to be played by pulling of the pin to ground. The message plays once unless the pin is held low. If held low, the message continues to repeat until the pin is allowed to get pulled to high.

The pin can be activated several ways as previously set forth. A Hall-effect sensor below a suspended magnet may be implemented in a preferred embodiment. When a train car travels along or is jarred on a track, the change in the magnetic field from the magnet swaying causes the Hall-effect sensor to activate and give a momentary pull to ground thereby initiating the chip. Therefore, the present invention is activated by inertia-sensitive control.

The fifth section of the present invention is the option of recording custom messages. The chip has a built-in microphone amplifier that can be used to record audio data. This is controlled by the state of the playback/record pin. When held low, the chip is then put into record mode and will record audio as long as the chip enable is held low. Alternatively, an external microphone may be implemented for recording on the chip.

Referring to FIG. 6, two microphone inputs to the ISD device, MIC (pin 17) and the MIC REF (pin 18) are illustrated. The two pins are differential inputs to an on-chip microphone preamplifier. A non-biased microphone can be connected directly across the two inputs. A 470 kOhm resistor, connected parallel to a 4.7 MF capacitor is placed across the automatic gain control AGC input (pin 19). These two components set up the attack and release time constant for the internal AGC circuit inside the chip. The AGC circuit controls the gain of the microphone preamplifier built inside the chip.

To record a new message on the chip, two pins on the chip are controlled, /Chip Enable and Playback/Record. /Chip Enable controls the start of both the record and play cycles. The level of the Playback/Record pin will determine whether a new message is to be recorded or the saved message played back. Pin 27 (P/R) is normally held high and messages play back as long as chip enable (/CE pin 23) is held low. If P/R is pulled to ground and then /CE is pulled low, the chip is then automatically placed into record mode and records the analog signals in real time picked up by the microphone. Recording stops when /CE is brought high. As previously mentioned, by controlling the address or logic level, the location of the new message can be controlled such that it will not record over previous audio.

Due to the limited space available within model train locomotives and cars, the present configuration uses two narrow elongated printed circuit boards (PCB's) stacked upon each other on which the electronic components are mounted in this embodiment. The circuit boards are electrically interconnected by means of a multi-pin plug on the upper PCB and a mating socket on the lower PCB.

Figures 7A, 7B, 7C:
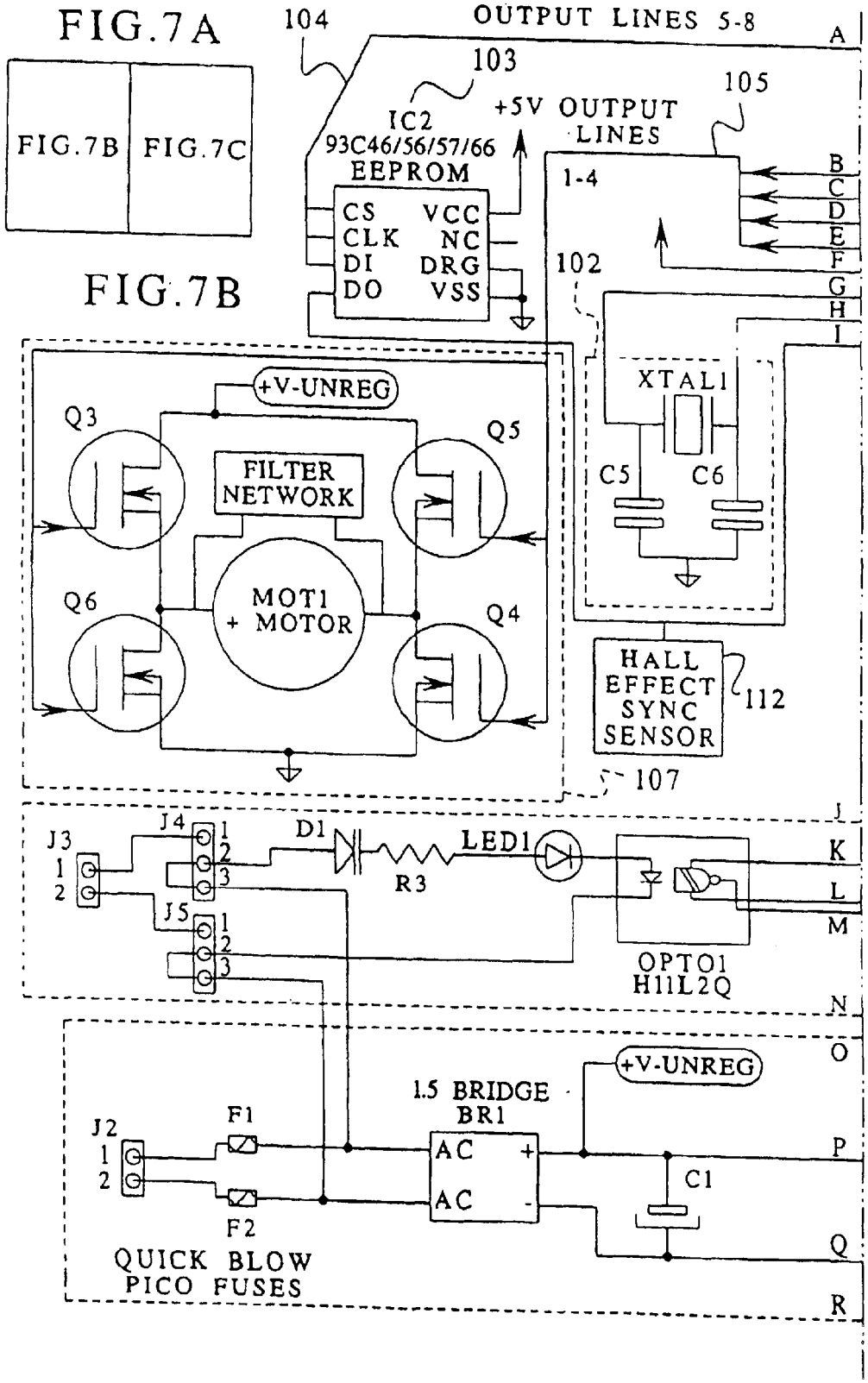
FIGS. 7A–7C illustrates in schematic diagram form of the components contained on the first of two printed circuit boards in the original configuration.
Figure 7C:
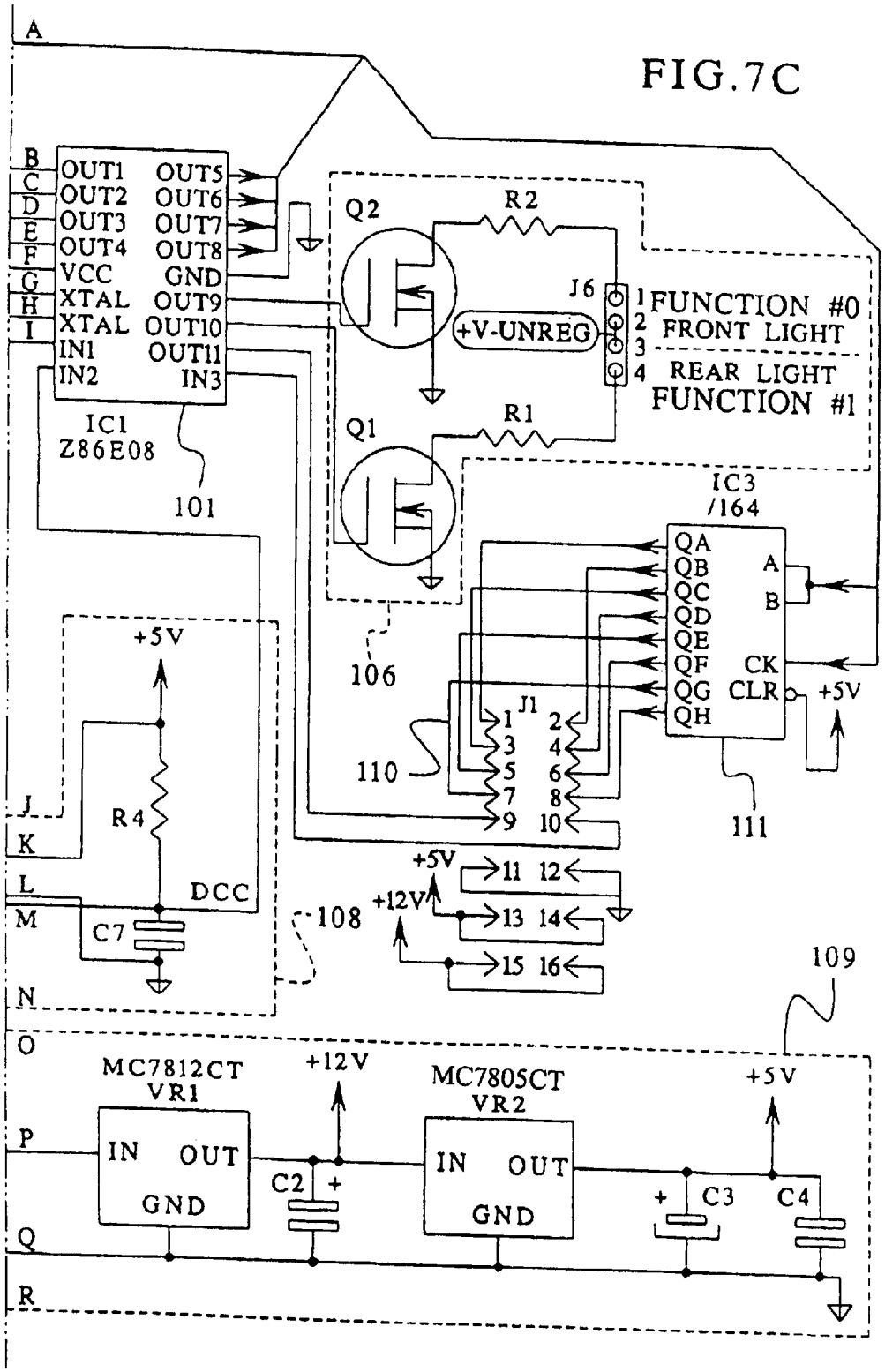

FIG. 7 illustrates in schematic form the components mounted on the upper PCB. The micro-controller, IC1 section 101 contains and executes the software program required for this invention. The present configuration of this invention uses a Part. No. Z86E08-08PSC from Zilog, Inc., Campbell Calif., IC1 Section 101. The other components mounted on the upper PCB are the micro-controller oscillator section 102, IC2 103, a Part No. 93C56A serial electrically erasable read only memory from National Semiconductor, Inc., Santa Clara, Calif.; the function #0 and #1 output transistors and connector section 106; the motor drive transistors and filter network section 107; the DCC digital input signal conditioning components section 108; the power supply section 109; the electrical plug to the lower PCB section 110; a shift register section 111; and a Hall effect sensor section 112.

Figures 8A, 8B, 8C:
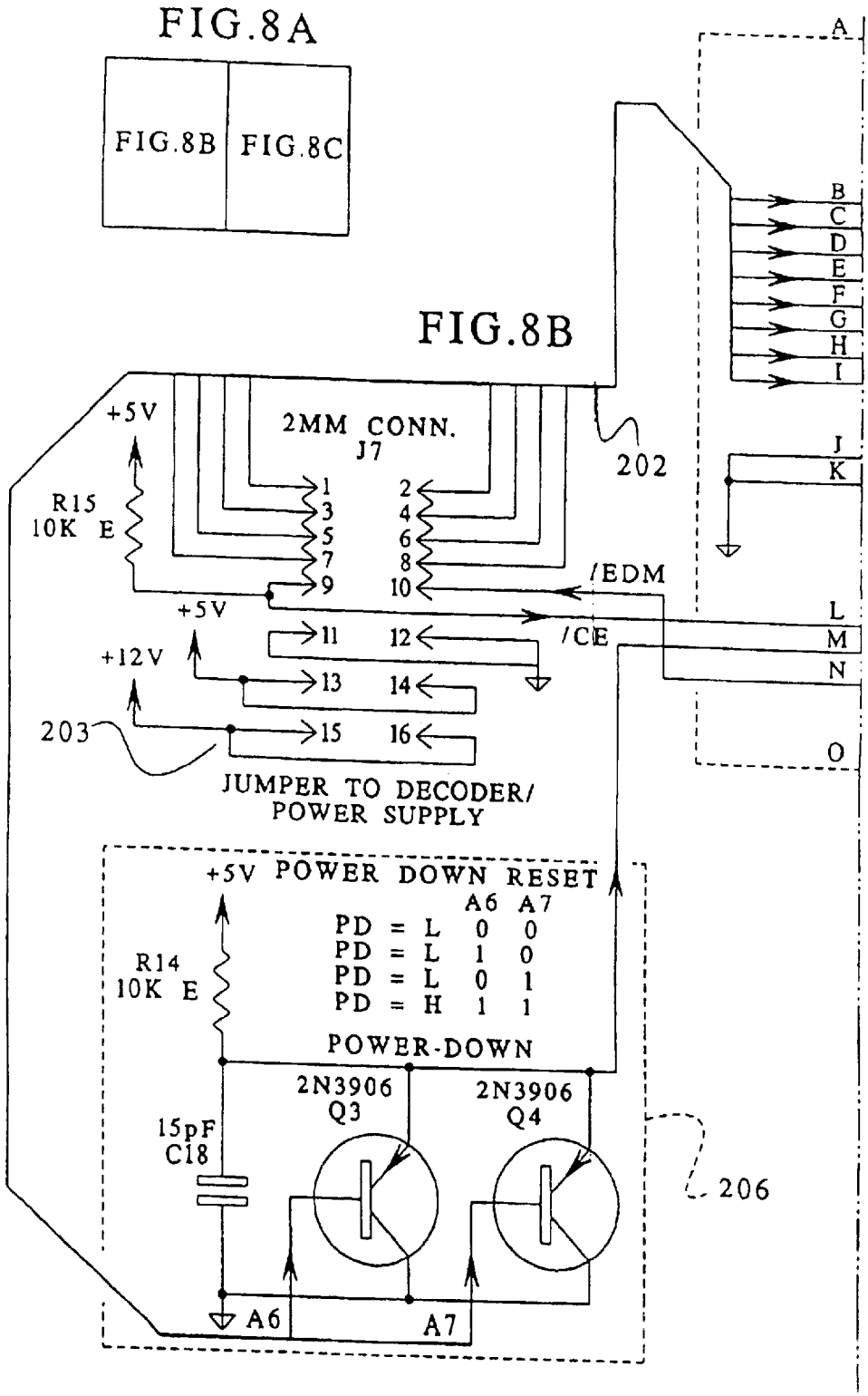
FIGS. 8A–8C illustrates, in schematic diagram form, the components contained on the second of two printed circuit boards in the original configuration.

FIGS. 8A–8C illustrates in schematic form the components mounted on the lower PCB in the present configuration. The direct analog storage, DAST™, integrated circuit, IC5, and associated decoupling capacitors section 201. The present configuration of this invention uses a Part No. ISD1020A for IC5 from Information Storage Devices, Inc., San Jose, Calif. The other components mounted on the lower PCB are the mating socket to the upper PCB section 203; an audio compander circuit section 204; an audio amplifier circuit with volume control section 205; and a Power Down/Reset Circuit section 206.

Referring now to FIGS. 7A–7C, operation of the upper PCB of the present invention will be described. A bi-polar digital signal of sufficient voltage and current is attached to J2 section 109 and the jumpers on J4 section 108 and J5 section 108 are placed between pins 2 and 3 on each. In this configuration, the power source is also the digital signal; a common example being "DCC", a protocol of the National Model Railroading Association (NMRA). This is the configuration used when the present invention is installed in a model railroad locomotive or car as J2 section 109 may be wired to the track using mechanical electrical pickups on the wheels.

An alternate configuration uses a separate power source between 14 to 24 volts AC or DC which is connected to J2 section 109 on the upper PCB, and the jumpers set on J4 section 108 and J5 section 108 are placed between pins 1 and 2 on each while a bi-polar digital signal is attached to J3 section 108.

In either configuration, the unregulated AC, DC, or bi-polar DC power source passes through fuses F1 and F2 section 109. These fuses protect both legs of the power source and, to some degree, protect from shorts, overloads, or other faults involving the present invention or associated field wiring. The power source is then passed through a bridge rectifier (BR1) section 109 to two voltage regulators, VR1 (MC7812CT) 109 and VR2 (MC7805CT) section 109 to associated filter and decoupling capacitors. A heat sink is attached to VR1 and VR2 section 109.

The result is three power supply potentials consisting of a "V+" unregulated output for sourcing the special effects outputs and motor control a regulated "+12 vdc" powers the audio amplifier circuitry, and a regulated "+5 vdc" to power the logic circuitry.

The digital signal whether input through J3 section 108 or J2 section 109 is half-wave rectified by D1 section 108, current limited by R3 108, and is annunciated by LED 1 section 108. It then enters a Schmitt trigger opto1-isolator, (OPTO) section 108. The opto-isolator provides a safety layer of isolation between the signals input and field wiring in the model setting. The Schmitt trigger aspect protects from data errors due to [low level] *low-level* digital noise. The digital signal exits the opto-isolator in an inverted state and enters a micro-controller (IC1) through the Input No. 2 line section 101.

The micro-controller's speed is set by a Crystal (XTAL 1) section 102 and an [on board] *on-board* oscillator.

There are several output lines associated with the micro-controller section 101. Two of the lines, output 10 and output 9, are connected to the gates of driver MOSFET transistors, Q1 and Q2 section 106, which are open drain, active low auxiliary outputs; function No. 0 and function No. 1 (F0 and F1) section 106. The transistors have current limiting resistors R1 and R2 section 106 connected to the drain-source path, in series with the load. The current limiting resistors' values are selected according to the load(s). In a typical model railroading application, Q1 is connected to a flashing LED beacon or similar device and is controlled as F1. Q2 is connected to the locomotive headlight and is controlled as F0. The use of F0 as head lamp control is based upon the NMRA DCC standard; however the function outputs can be re-configured for different loads and control assignments.

Output lines 1–4 section 105 are connected to the gates of driver MOSFET transistors, Q3–Q6 arranged in an H-bridge configuration section 107 for pulse width modulated bi-directional control of a DC motor. A controllable filter network is connected across the DC motor for the modification of motor drive wave shapes for the suppression of undesirable audible noise section 107.

Output lines 5–8 section 104 are connected to the serial EEPROM section 103 and a shift register section 111. The serial EEPROM contains many memory registers which contain information that is used to define various operating characteristics of the invention. Most of these registers are defined by the NMRA and are termed Configuration Variables (CV or CV's). Some of the registers are set aside for application specific uses defined by the manufacturer. Most of the CV's can be altered by the hobbyist through programming. The digital address of the sound effect to be played is loaded by the micro-controller into the shift register section 111.

Output line 11 and input line 3 on the micro-controller section 101 are connected to the multi-pin plug section 110 which routes signals to the lower PCB.

Figure 8C:
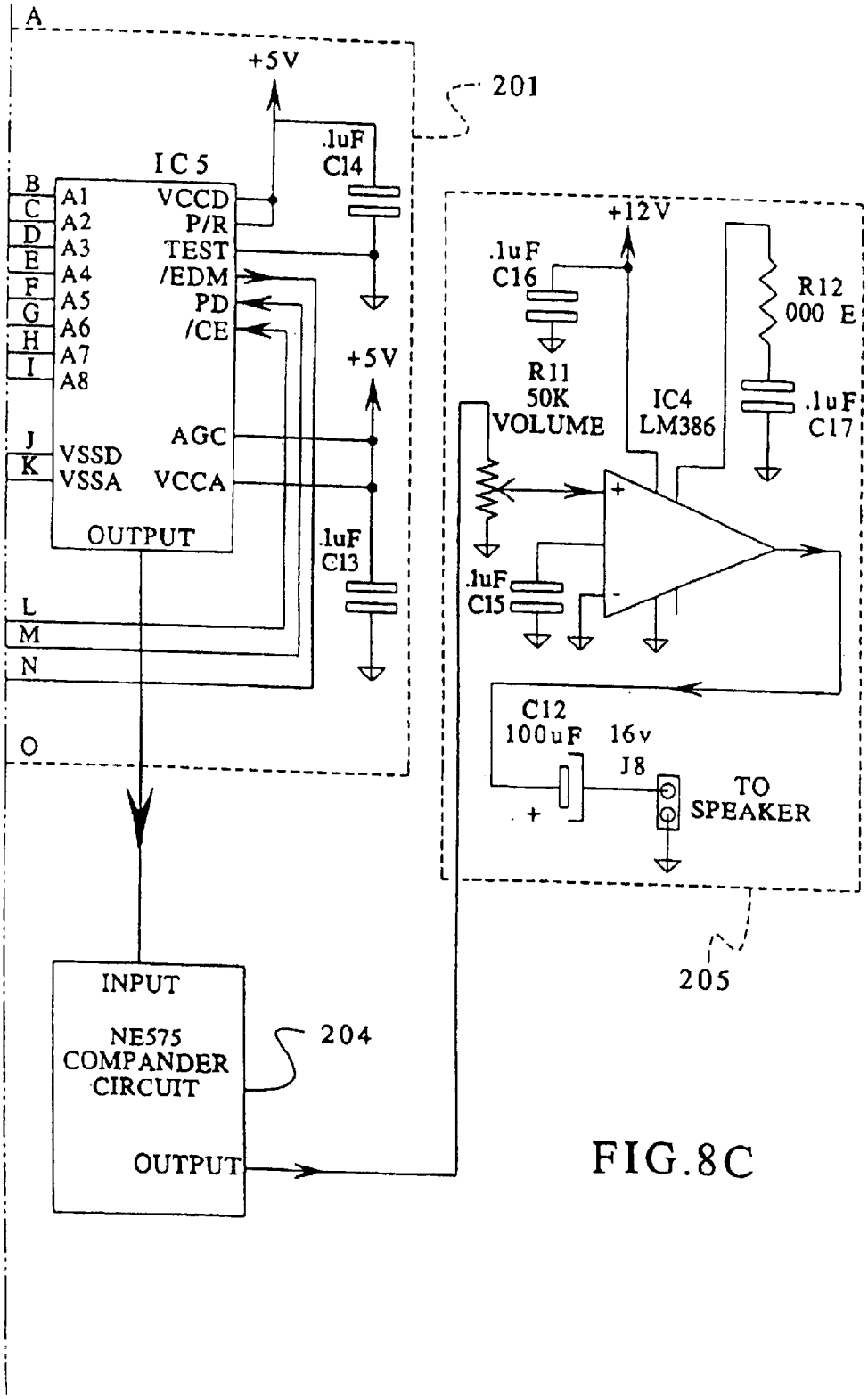

Now refer to FIG. 8 to understand the operation of the lower PCB of the present invention.

The DAST™ chip (sound effect chip), IC5 section 201 is the first section of the circuit component on the lower PCB. The DAST™ chip is capable of storing between twelve seconds and 120 seconds of analog data in a non-volatile memory. Various audio sound effects can be programmed into the DAST™ chip. The location of the various sound effects in the DAST™ chip are assigned by setting the appropriate bits on the DAST™ chip's address inputs. At the time of recording, these address locations may be set by some type of development system. During playback, the address locations are set by the micro-controller, IC1 section 101.

When the sound effects are played back from the chip as set by the microcontroller IC1 section 101, they are played back through an audio compander section 204. The expansion does two things: the audio is expanded and the signal is restored to its original dynamic range; and when the audio is expanded, low-level audio noise in the system is attenuated giving an improved signal-to-noise ratio.

The third section of the circuit is the audio amplifier. In a preferred embodiment, the amplifier is an LM386N (IC4) section 205. The output of the audio expander is capacitively coupled to a volume potentiometer. The wiper of the potentiometer is the input of the amplifier. The output of the amplifier is capacitively coupled and connected to a potentiometer.

The fourth section of the circuit is the sound effect activation or chip enabling section of the circuit. One pin of the DAST™ integrated circuit (IC5) section 201 is the chip enable. Chip enable (/ce) is an active low signal, and the pin is pulled high with a resistor. Chip enable is connected with output line 11 on the micro-controller. Sound effect playback is initiated by loading the appropriate address bits into the shift register section 111 on the upper PCB and then bringing chip enable low. Typically, for playback of a single sound effect, /ce is brought high after sound effect playback begins. If playback of consecutive sound effects is desired, /ce is left low. At the end of each sound effect, a signal is generated on another pin of the DAST™ chip (IC5) called End of Message (/eom) (active low). /eom is connected to input line No. 3 of the micro-controller section 101 through socket J7 section 203 and J1 section 110. If it is desired to repeat a sound effect, either with spaced repetition or with seamless loping, /eom is monitored to mark the end of the current sound effect being played allowing the micro-controller to precisely control repetition or looping.

PNP transistors Q3 and Q4 section 206 have their bases connected to A6 and A7, respectively, and their collectors are tied to ground. The open emitters of Q3 and Q4 are connected to a pin of the DAST™ chip (IC5) section 201 which is labeled Power Down, an active high input. Power Down is connected to a pull up resistor (R14) section 206 and a decoupling capacitor (C18) section 206. When A6 and A7 are both high, Power Down goes high and the DAST™ chip (IC5) is taken into a standby state and reset. This is useful if the DAST™ chip (IC5) should ever become errant in operation or if it is desirable to interrupt a sound effect being played before it has reached completion.

Figures 9A, 9B:
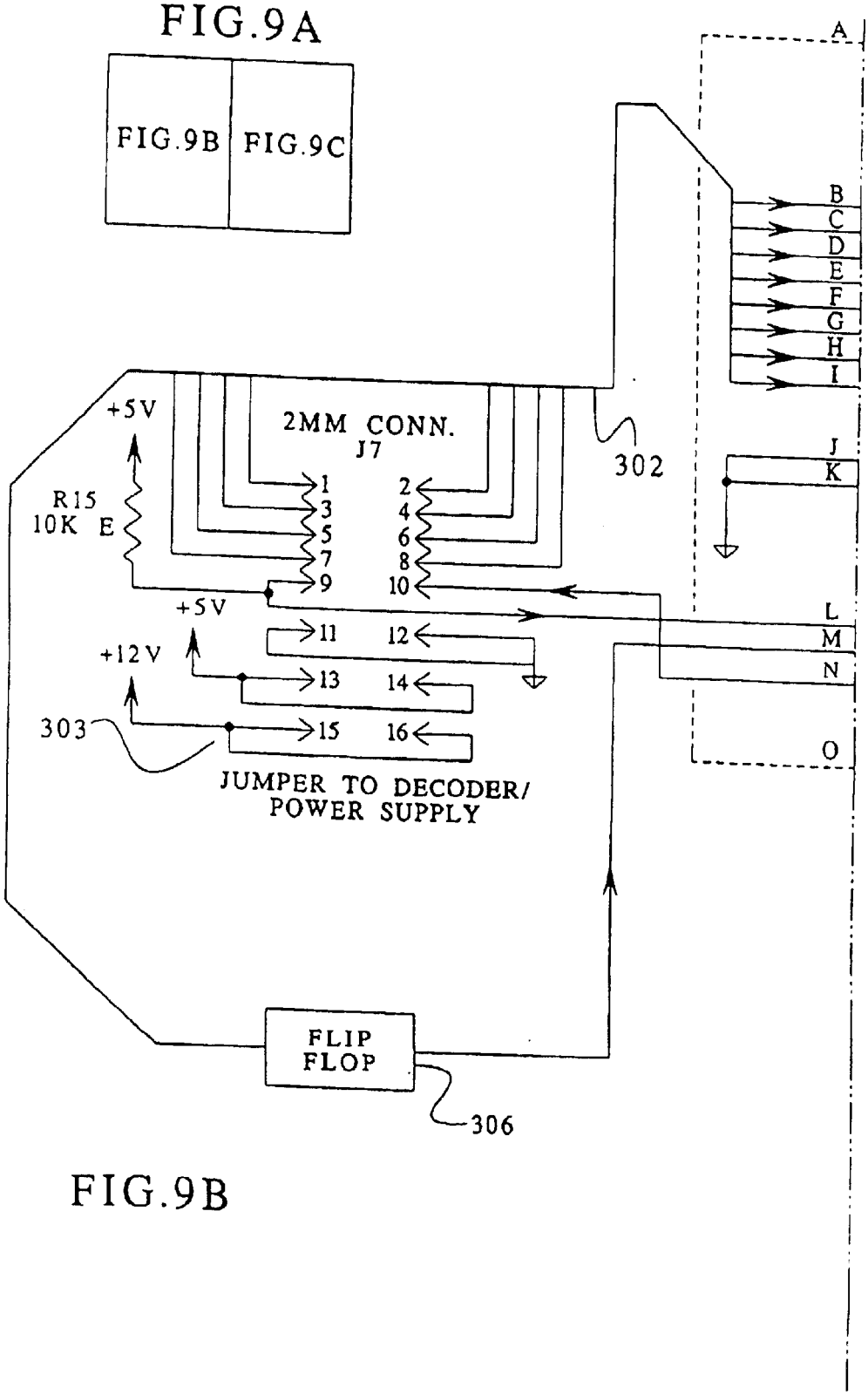
FIGS. 9A–9C illustrates in, schematic diagram form, the components contained on the second of two printed circuit boards in an alternate configuration.
Figure 9C:
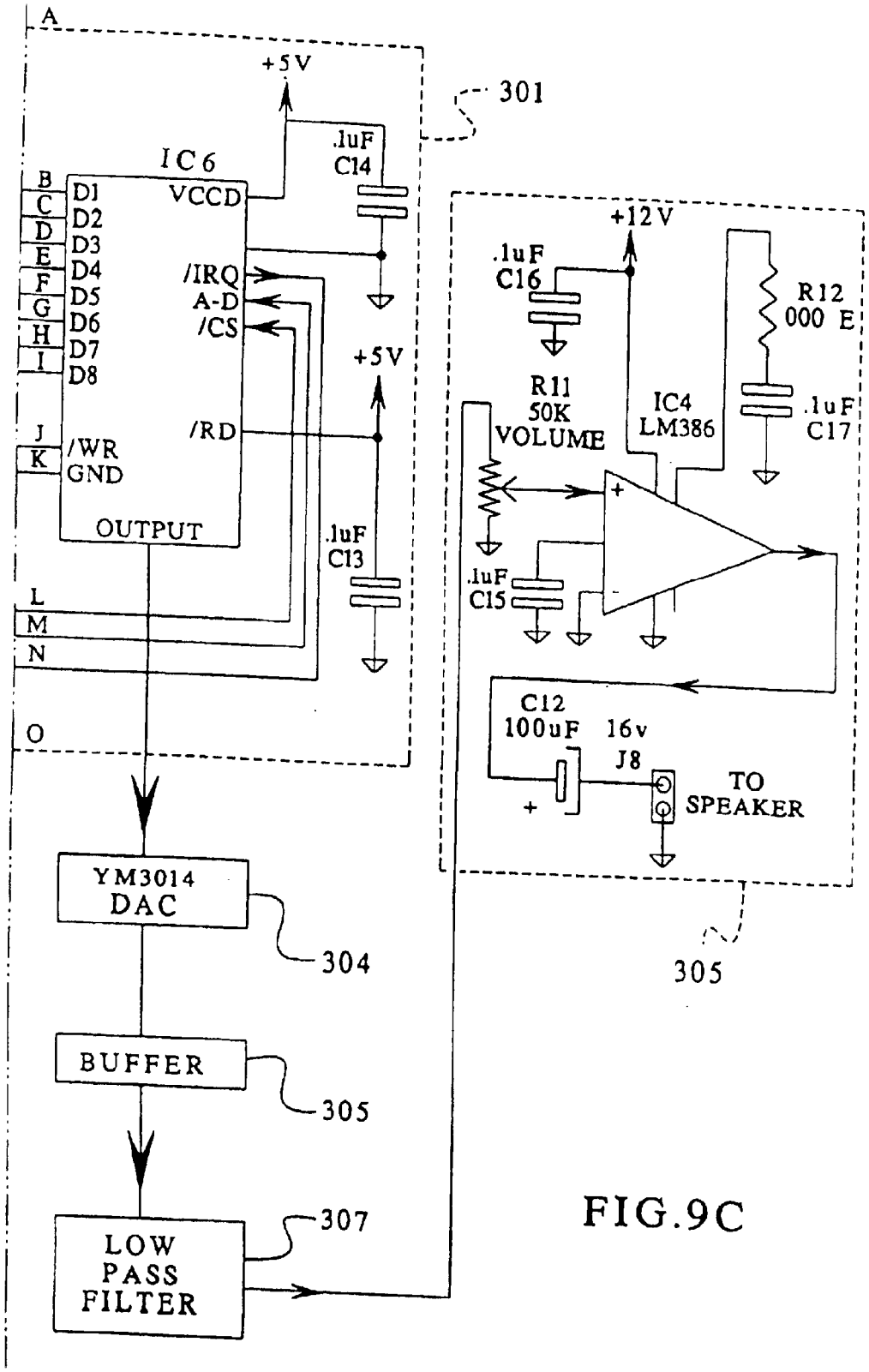

Now refer to FIGS. 9A–9C in order to understand the operation of the lower PCB of the present invention in an alternate configuration, to play back multiple sound without using additional DAST™ memories for sound on sound.

A digital synthesizer integrated circuit IC6 in section 301 is now used for the production of sound effects. The present invention uses a Part No. YM3812 sound generator from Yamaha Systems Technology; San Jose, Calif. for IC6 section. Sound effects are created by alternately loading address and data information into lines D1–D8 on IC6 section 301. The alternating action is controlled by a flip-flop section 306. A digital to analog converter (DAC) section 304 is used to change the digital outputs of IC6 section 301 into varying voltages, which are the sounds. In the present invention, a Part No. YM3014 from Yamaha Systems Technology, San Jose, Calif. is used for the DAC. The output of the DAC feeds into a unity gain buffer section 305. The output of the buffer feeds into a low pass filter section 307 before reaching the volume control potentiometer R11 which is part of the audio amplifier circuit section 305. In the present configuration, the amplifier is an LM386N (IC4) section 305 from National Semiconductor, Inc., Santa Clara, Calif. The wiper of the potentiometer is the input of the amplifier. The output of the amplifier is capacitively coupled and connected to a speaker.

Now a detailed explanation of the software operation will be given. Refer now, additionally, to FIGS. 11–20.

Beginning at <START> section 501, the micro-controller section 101 is initialized in section 502. The appropriate lines are configured as either input or output. Initial values are loaded into specified registers of the micro-controller section 101. One important value is the address which is loaded section 503 from the serial EEPROM section 103. The address determines which data transmissions are intended for the device to act upon. Input line No. 2 on the micro-controller section 101 then begins to receive transmitted data from the components in section 108. The present invention is configured to accept data transmissions based upon a digital protocol "Digital Command Control" DCC; a standard established and maintained by the National Model Railroad Association, Chattanooga, Tenn.

Figure 10:
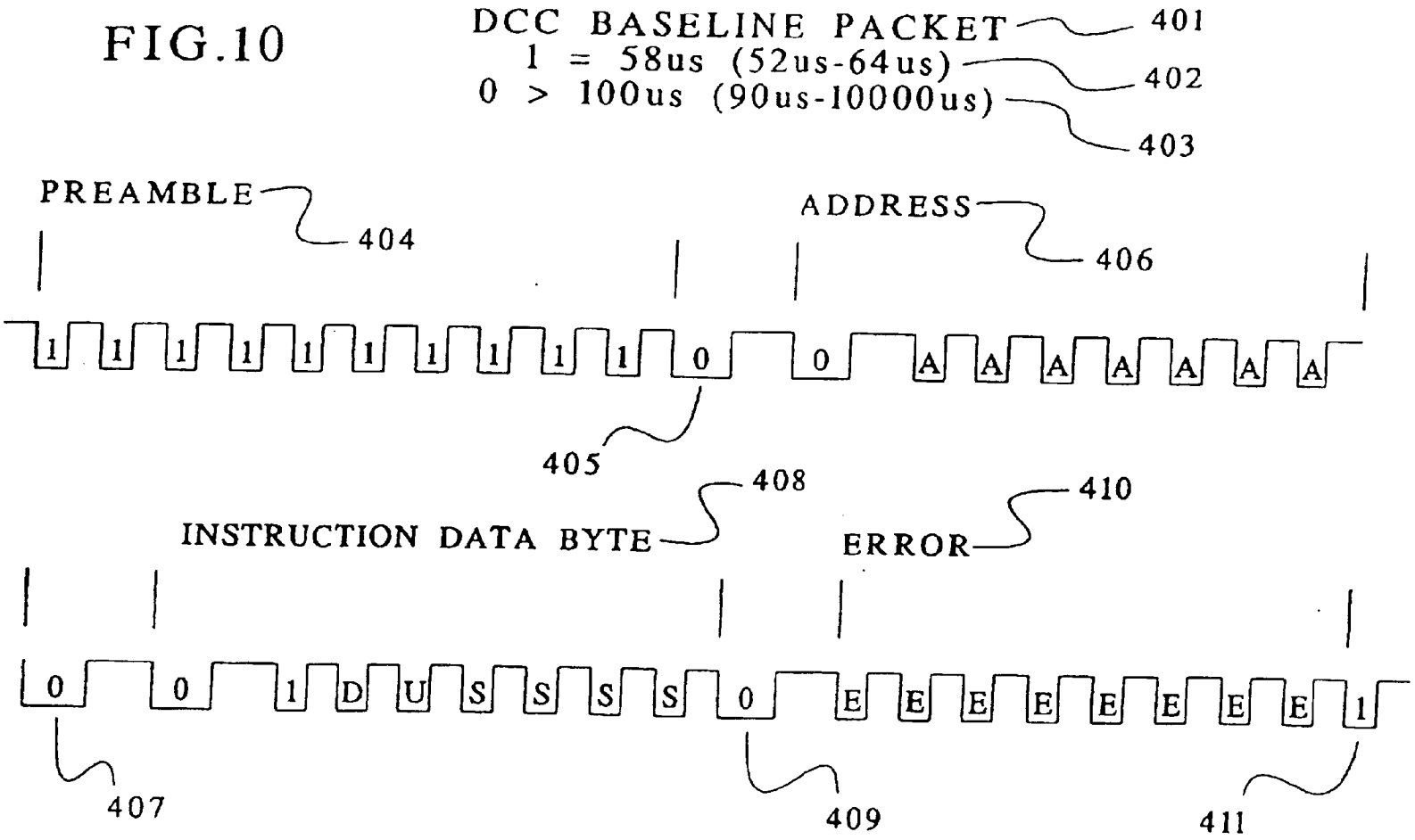
FIG. 10 illustrates a graphical representation of a Digital Command Control (DCC) baseline packet.

Refer now additionally to FIG. 10 to understand the form of the digital data transmissions. DCC data consists of bi-polar transmissions of square wave pluses each containing two equal parts: one positive and one negative. The width or duration of the pulse determines if it will be interpreted as a digital "0" bit or a digital "1" bit. A digital "1" bit in a DCC transmission has a nominal duration of 58 microseconds for each of its two parts, section 402. A digital "0" bit in a DCC transmission will have a nominal duration of 100 microseconds for each of its two parts, section 403. A complete DCC transmission can contain a varied number of bytes and is termed a packet. The one chosen for example here is a DCC baseline packet section 401. A baseline packet contains four separate components, which are the preamble section 404, the address byte section 406, the instruction data byte section 408, and the error byte section 410.

Figure 11:
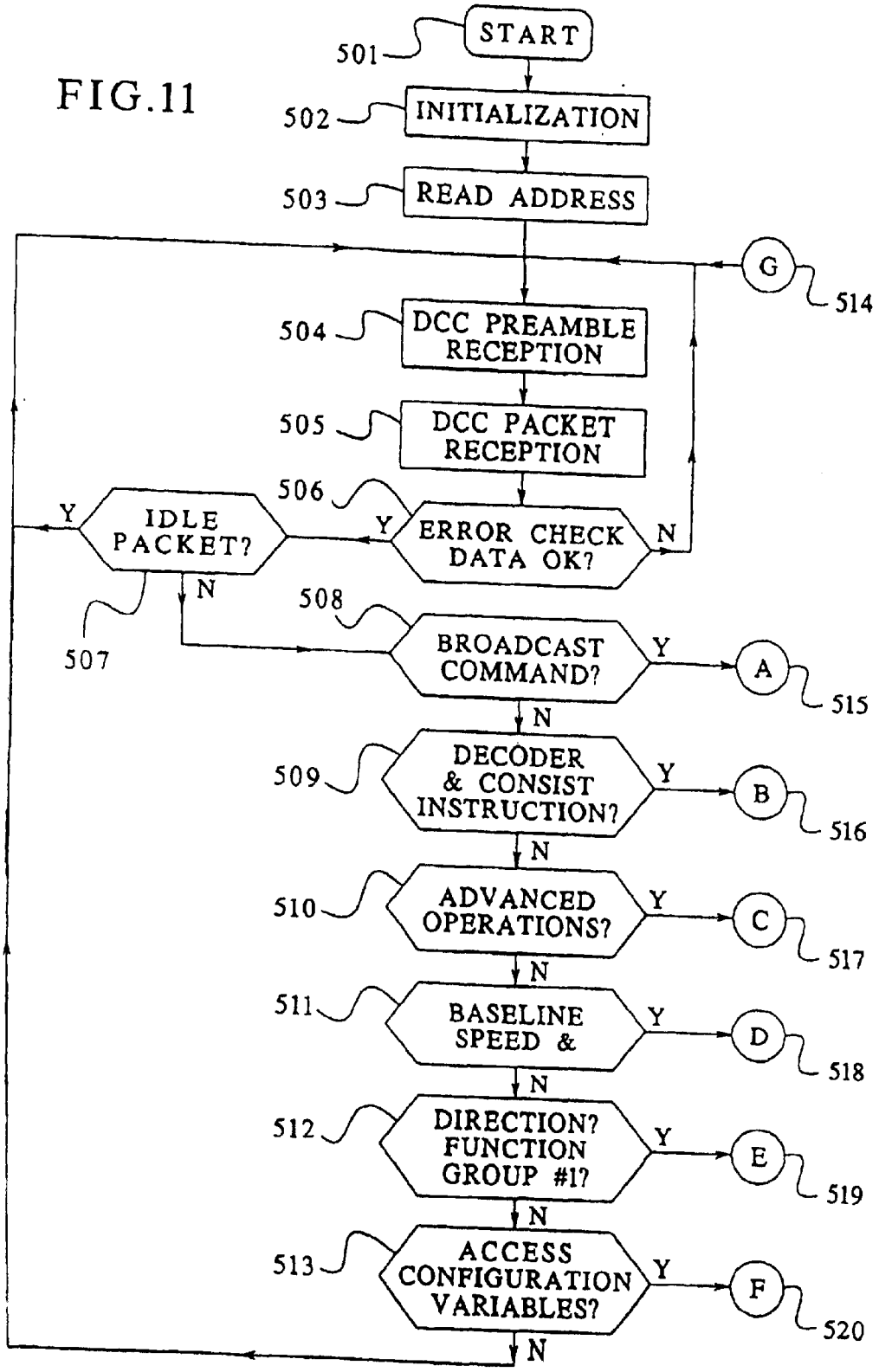
FIGS. 11–20 illustrate, in flow chart form, the operation of the micro-controller software.
Figure 12:
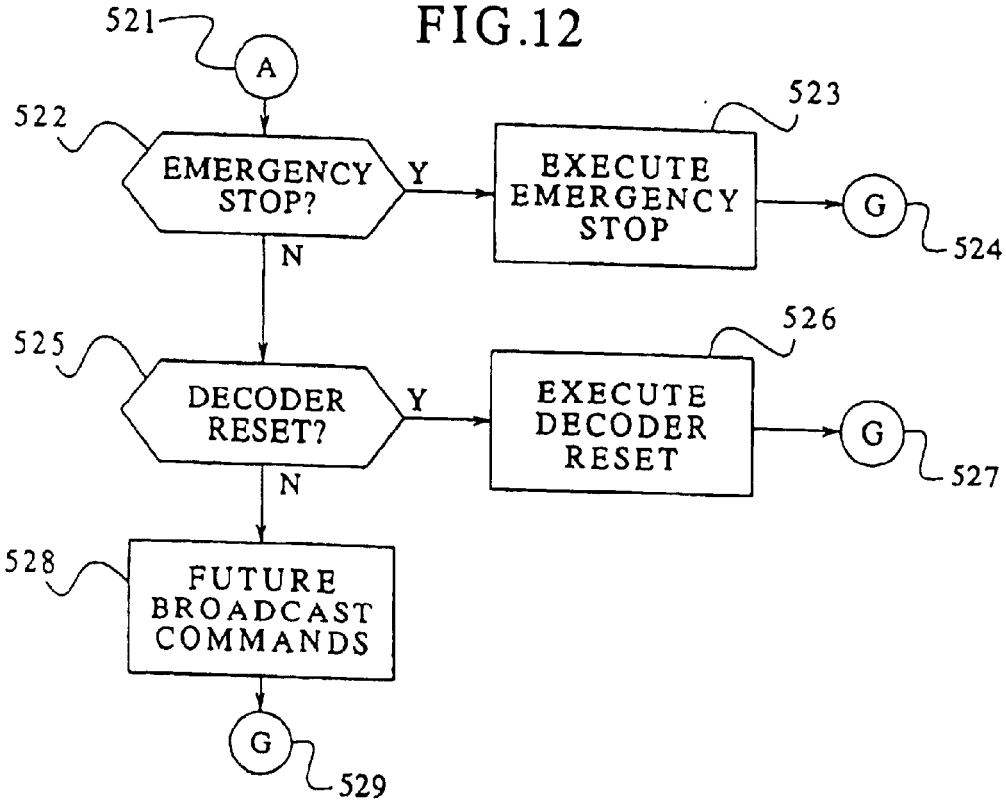
Figure 13:
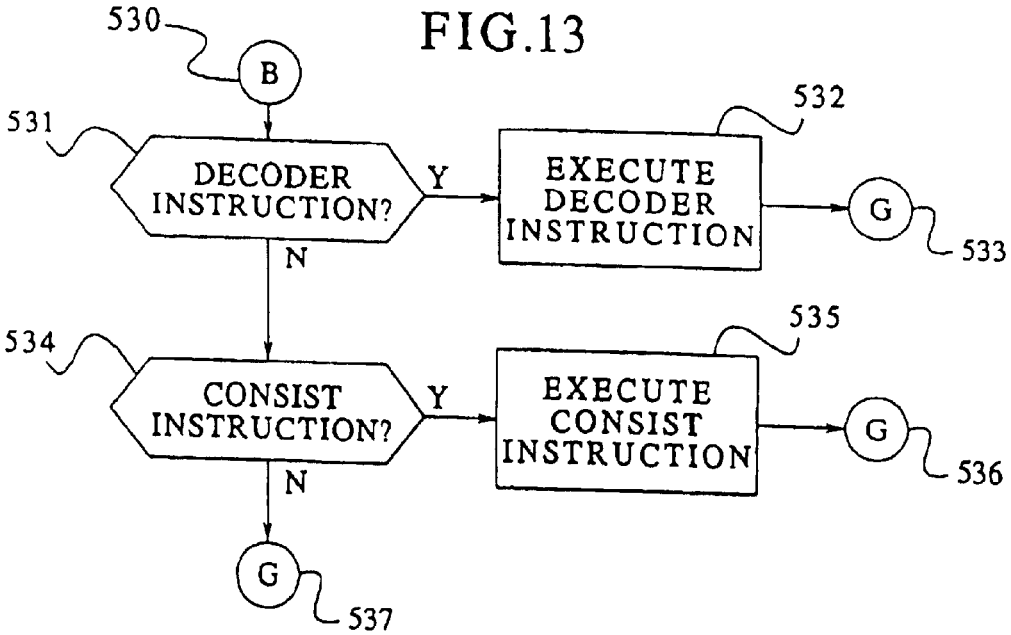
Figure 14:
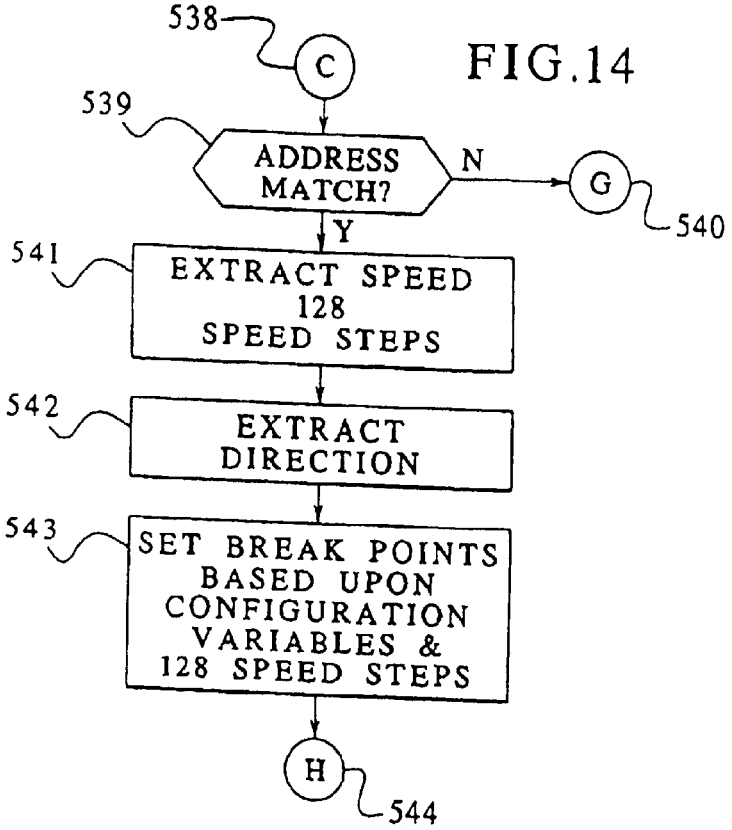
Figure 15:
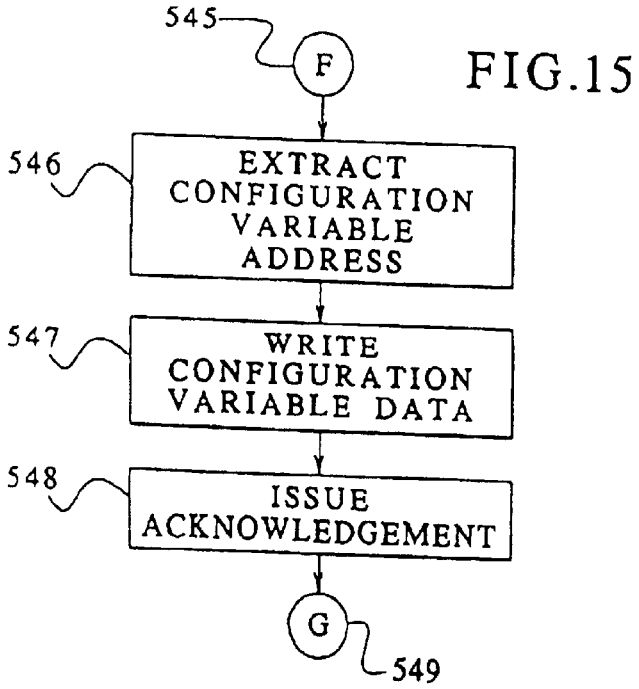
Figure 16:
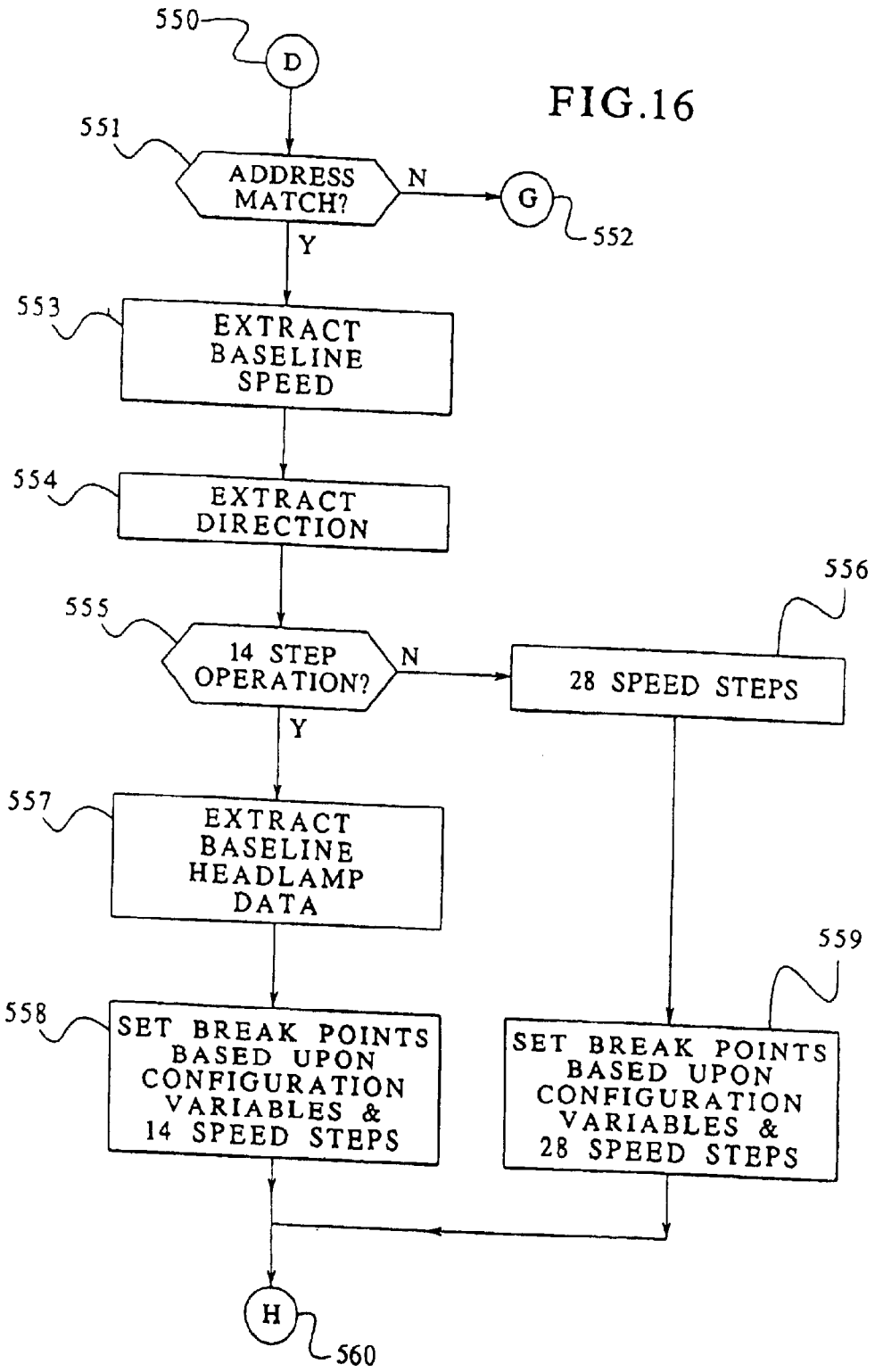
Figure 17:
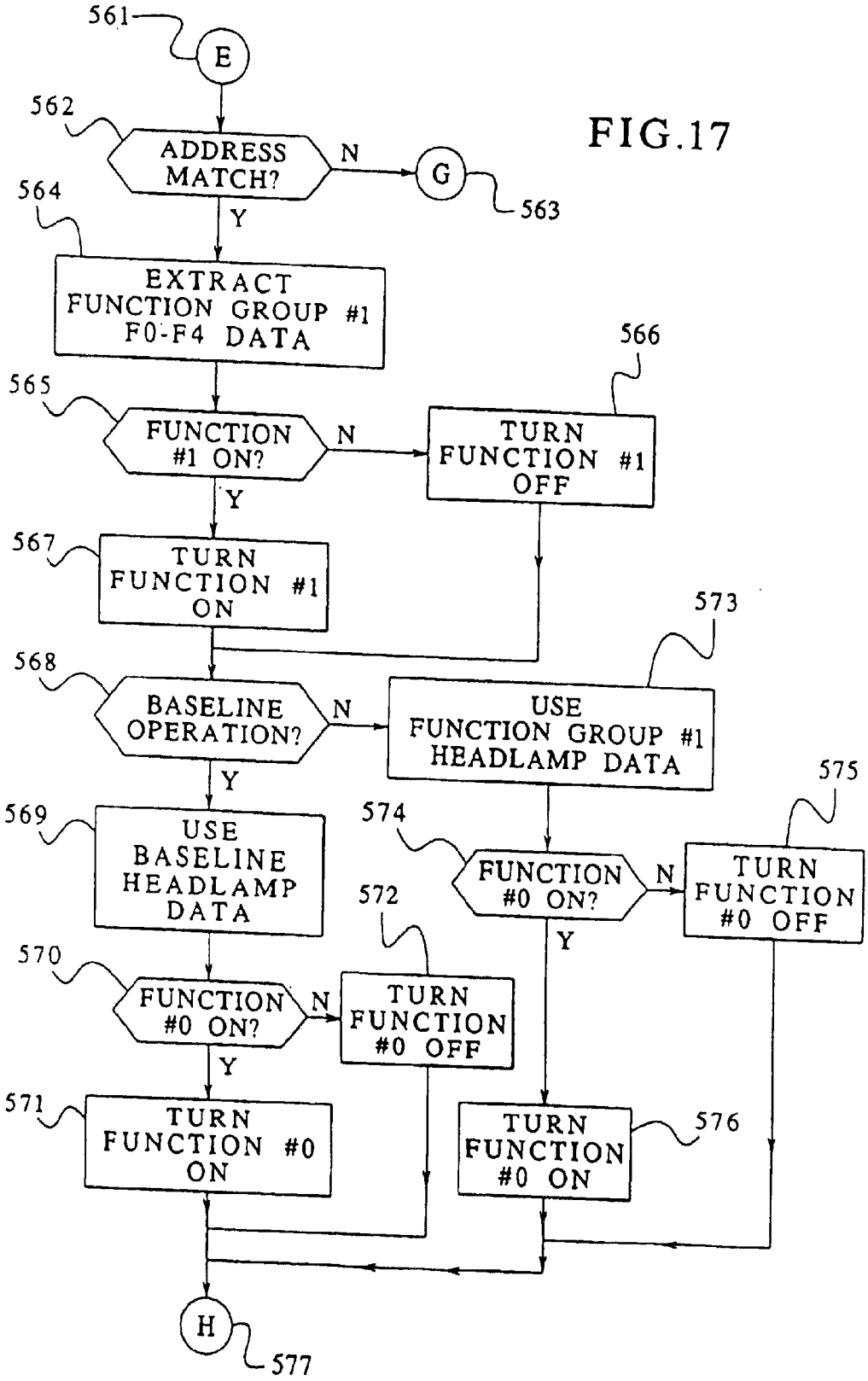

Refer alternately to FIGS. 10 and 11 wherein section 504 of the software looks at the preamble part section 404 of the DCC transmission. It is distinguished as a minimum of 10 "1" bits followed by a "0" bit section 405. Once reception of the preamble is completed, the software will begin to receive the rest of the bytes in section 505. Next is the address byte section 406 which contains eight bits which can have a value of either "1" or "0" and is terminated by a digital "0" bit section 407. Next comes the instruction byte section 408 which also contains eight bits and is terminated by a "0" bit as well as section 409. The last byte in a baseline packet is the error byte section 410 which contains eight bits and is terminated by a "1" bit section 411. The "1" bit also signifies the termination of the packet.

Once a complete packet is received, the software then checks the validity of the data by performing an error check in section 506. The error check requires that the Exclusive-Or logical function be performed upon the address byte and the data byte. If the result of this operation matches the value of the error byte, the packet is valid. If the packet is rejected as invalid, the software loops back to section 504 to await the next preamble.

If the data is deemed valid, it is first checked in section 507 to see if this was a baseline idle packet. Idle packets are part of the DCC standard and are often used for time delays. If an idle packet is detected, the software loops back to section 504 to begin receiving the next preamble, as no further action is required.

If the packet was found not to be an idle packet, several tests are performed to determine what action is to be taken based upon the data. In each case, a failed test causes a branch to the next test.

Beginning with test section 508, if it is determined, this data is intended for any and all devices receiving the data; or as termed by the DCC standard, a broadcast command. If it is, a branch is taken at section 515. At the completion of the branch, the software is at section 521 of FIG. 12. The broadcast command data is tested to see if an emergency stop command has been issued at section 522. If an emergency stop command is detected, the appropriate actions are taken to [effect] *affect* an emergency stop of the model train locomotive section 523. The software then branches at section 524 back to FIG. 11 at section 514 to begin receiving a new preamble. If the broadcast command is not an emergency stop command, it is then tested to see if the present invention should be reset at section 525, termed a decoder reset by the DCC standard. If a decoder reset command has been received, the decoder is reset in section 526. The software then branches at section 527 back to FIG. 11 at section 514 to begin receiving a new preamble. If the broadcast command is not a decoder reset command, then it may be a future command which may be handled in section 528 with the appropriate action being taken. The software then branches at section 529 back to FIG. 11 at section 514 to begin receiving a new preamble.

Referring now to FIG. 11 at section 509, if the received data is not a broadcast command, it tests to see if it is a utility instruction for the decoder or consists of an instruction for the grouping of model train locomotives. If it is, a branch is taken at section 516 to FIG. 13 at section 530. The data is tested in section 531 if a decoder instruction is intended. If it is, the specific decoder instruction is executed in FIG. 13 at section 532. The software is then branched at section 533 back to FIG. 11 at section 514 to begin receiving a new preamble. If the data is not a decoder instruction (FIG. 13, section 534), it may be a consist instruction. If it is, several possible actions can be taken in FIG. 13 at section 535 to allow two or more model train locomotives to be grouped together and function in actual operation as one. Once the consist instruction has been completed, or if the data does not contain a consist instruction, a branch is taken at section 536 or section 537 back to FIG. 11 at section 514 to begin receiving a new preamble.

Now referring to FIG. 11 at section 510, if the received data is not a decoder or consist instruction, it is tested to see if it contains advanced operations information. If it does, a branch is taken at section 517 to FIG. 14 at section 538. In section 539, the address information contained within the received data is compared to the pre-programmed address of the present invention. If the addresses do not match, it would be known that the information was intended for some other device. The software then branches at section 540 back to FIG. 11 at section 514 to begin receiving a new preamble. If the addresses match, it is known that the information contained within the advanced operations packet is intended for this device. Advanced operations is the means by which the DCC transmits speed data and direction when 128 step speed resolution is in place. Speed resolution may be explained as the maximum speed divided by the number of speed steps. If a model train locomotive has a maximum scale speed of 64 MPH and 128 step speed resolution is in place, each speed step is equal to a ½ MPH increment. This is considered fine resolution. The speed and direction information is extracted from the data in sections 541 and 542, respectively. There are several sound effects to cover the operational speed range of a model train locomotive, whether steam or diesel type. This allows the sounds generated to closely correlate with the speed at which a model train locomotive is traveling for realistic operation. In some cases, there may not be sufficient sound effects to provide for a 1-to-1 ratio between speed steps and sound effects. The end user is then able to program certain configuration variable memory registers defined by the manufacturer and contained within the serial EEPROM FIGS. 7A–7C at section 103. These configuration variables then determine when a change is made from one sound effect to another over the span of a given speed step resolution. These change divisions are termed break points and are set based upon 128 speed step resolutions in section 543 of FIG. 14. The software then branches to section 544 of FIG. 14 to FIG. 19 at section 578. Further detail is offered later on FIG. 19.

Moving back to FIG. 11 at section 511, if the received data does not contain advanced operations information, it is tested to see if it is a baseline packet. If it is, the software branches at section 518 to FIG. 16 at section 550. In section 551, the address information contained within the received data is compared to the pre-programmed address of the present invention. If the addresses do not match, it is then known that the information was intended for some other device. The software then branches to section 552 back to FIG. 11 at section 514 to begin receiving a new preamble. If the addresses match, it is known that the information contained within the baseline packet is intended for this device. The baseline speed and direction information is extracted from the data in sections 553 and 554, respectively. The baseline packet can contain speed information in either 28 step medium or a 14 step coarse resolution. A configuration variable is checked to see which resolution is currently being used in section 555. If it is determined that a 28 speed step resolution is in effect at section 556, then the break points are set based upon 28 speed step resolution and the configuration variables reserved for break points at section 559. If it is determined that 14 speed step resolution is in effect, baseline [head lamp] *headlamp* data is extracted at section 557. Then, the break points are set based upon a 14 speed step resolution, and the configuration variables are reserved for break points at section 558. After the break points are set for either 14 or 28 speed steps, the software then branches at section 560 to FIG. 19 at section 578. Further detail will be offered later on FIG. 19.

Referring now back to FIG. 11 at section 512, if the received data is not baseline packet, it is tested to see if it is a Function Group #1 Packet. If it is, the software branches at section 519 to FIG. 17 at section 561. In section 562, the address information contained within the received data is compared to the pre-programmed address of the present invention. If the addresses do not match, it would be known that the information was intended for some other device. The software then branches at section 563 back to FIG. 11 at section 514 to begin receiving a new preamble. If the addresses match, it is known that the information contained within the function Group #1 is intended for this device. The function Group #1 F0–F4 data is extracted in section 564. The data is then tested in section 565 to see if function #1 should be on or if it should be off. If function #1 should be on, it is turned on in section 567. If function #1 should be off, it is turned off in section 566. Referring now to FIG. 7, when function #1 should be on, output line #10 on the micro-controller section 101 is brought to a digital "1" state. Output line #10 is connected to the gate of MOSFET transistor Q1 in section 106. If an external device is connected across pins 3 and 4 of J6, current flows through the external device, current limiting resistor R1, and MOSFET transistor Q1; hence, the device is on. When function #1 should be off, output line #10 on the micro-controller section 101 is brought to a digital "0" state. Current ceases flowing through the external device, current limiting resistor R1, and MOSFET transistor Q1; hence, the device is off. Q1, R1, and J6 are in section 106.

Referring back to FIG. 17, the next aspect of software deals with function #0. Function #0 is typically used to control a model train locomotive headlight. A configuration variable is checked to see if baseline operation is in effect in section 568. If it is, the previously extracted baseline [head lamp] *headlamp* data at 557 is used at section 569 to determine at section 570 if function #0 should be [On] *on* at section 571 or off at section 572. Referring now to FIG. 7, when function #0 should be on output line #9 on the micro-controller section 101 is brought to a digital "1" state. Output line #9 is connected to the gate of MOSFET transistor Q2 in section 106. If an external device is connected across pins 1 and 2 of J6, current flows through the external device, current limiting resistor R2, and MOSFET transistor Q2; hence, the device is on. When function #0 should be off, output line #9 on the micro-controller section 101 is brought to a digital "0" state. Current ceases flowing through the external device, current limiting resistor R2, and MOSFET transistor Q2; hence, the device is off. Q2, R2, and J6 are in section 106. Referring back to FIG. 17, after the state of function #0 is set in sections 568–576, the software then branches at section 577 to FIG. 19 at section 578.

Figure 19:
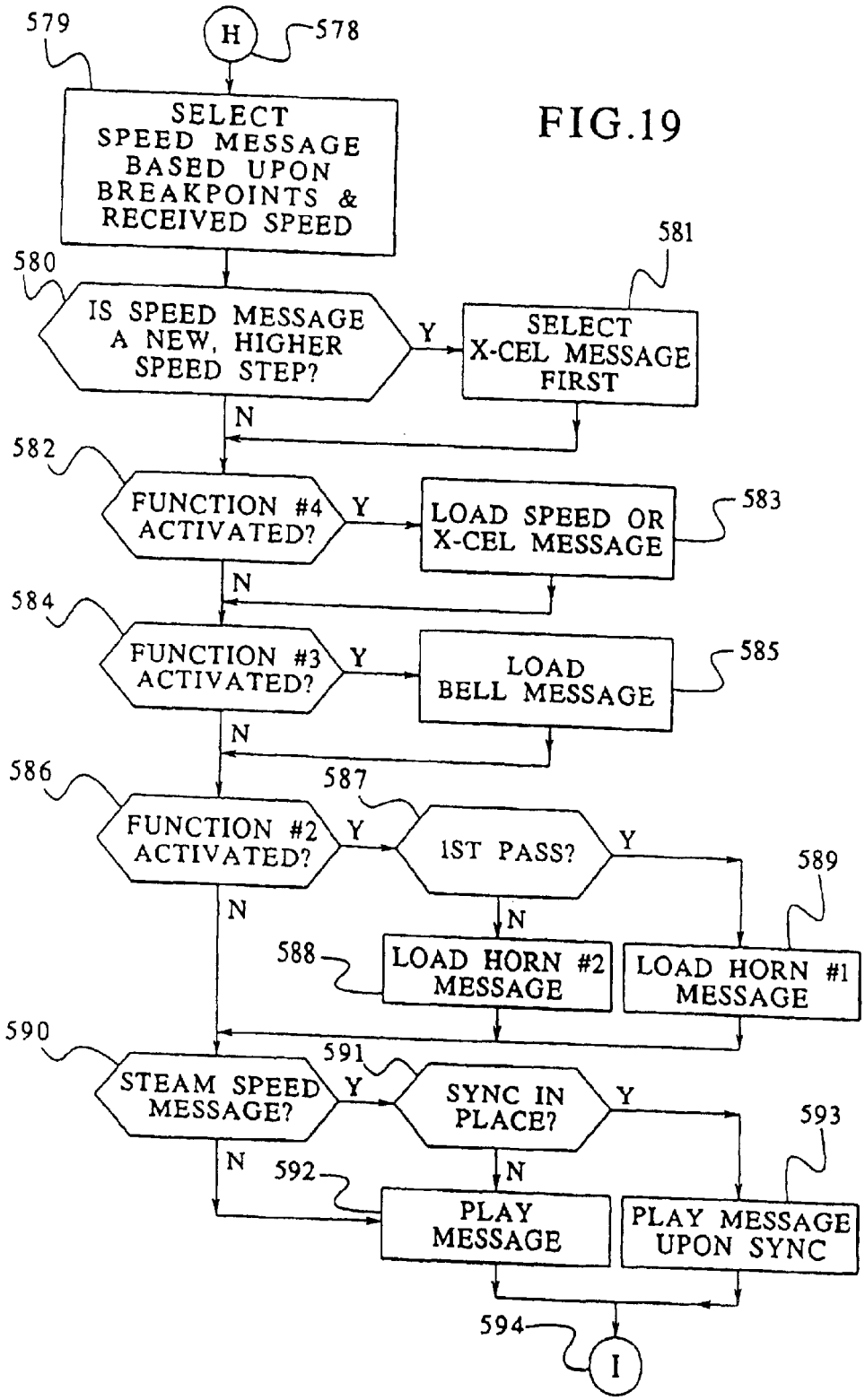

Referring now to FIG. 19, at this point all of the data required to select a model train locomotive sound effect should have been received and processed. In section 579, an appropriate engine sound or other sound effect is loaded based upon the previously set breakpoints and received speed. In the case of a model train diesel locomotive, it is appropriate to imply that if a slow speed has been received, then an engine sound effect of a diesel generator at slow rpm's is selected. Conversely, if a fast speed has been received, an engine sound effect of a diesel generator at high rpm's is selected. If the present invention is used with a model train steam locomotive, varying speed discrete chuff sound effects are selected. If a model train diesel locomotive is stopped, an ultra-low RPM idle sound effect is selected. If a model train steam locomotive is stopped, a gentle hissing sound is selected. If, at this point, all of the data required to select a model train locomotive sound effect has not been received and processed, a default sound effect is selected. In the case of a model train diesel locomotive, an air release sound effect is selected. In the case of a model train steam locomotive, a steam release sound effect is selected.

Once an engine speed sound effect has been selected, it is compared with the previously selected engine speed sound effect section 580. If the most recently selected sound effect is a higher and faster sound effect, a transitional acceleration sound effect is selected first at section 581. The status of function #4 mute, from the previously received function group #1 is now checked at 582. If function #4 is active, the selected engine speed or acceleration sound effect is loaded at 583. If function #4 mute is inactive, the software continues without loading an engine speed or acceleration sound effect. Whether or not a speed or acceleration sound effect is loaded, the software continues forward to see if higher priority sound effects should be played. Next, function #3 from function group #1 is now checked at section 584. If function #3 is active, the bell sound effect is loaded at section 585. If function #3 is inactive, the software will continue without loading the bell sound effect. Next, function #2 from function group #1 is now checked at section 586. If function #2 is active, a further test is conducted to see if this is the first time function #2 has been found to be active at section 587. If this is the first time function #2 is found to be active, the first horn or whistle sound effect is loaded for model train diesel or steam locomotives, respectively, at section 589. If the second time function #2 is found to be active, the second horn or whistle sound effect is loaded for model train diesel or steam locomotives, respectively, at section 588. Through concatenation, the model train enthusiast can create realistic horn and whistle cadences. A test is now performed to see if a steam engine speed effect has been loaded at section 590. If it is not, the last loaded sound effect is now played at section 592. If no sound effects have been loaded, no sound effects are played. This would indicate that functions #2, #3, and #4 are inactive thereby preventing the loading of the horn, whistle, bell, and engine speed sound effects, respectively. If the loaded sound effect is found to be a steam engine speed sound effect in section 590, a further test is performed to see if a Hall-effect wheel sync device in FIGS. 7A–7C at section 112 is in place at section 591. If it is not, the steam engine speed sound effect is played at section 592. If a sync device is in place, the steam engine speed sound effect is played upon the receipt of a sync pulse. If, however, more than one function is active and loaded for play-back, then more than one sound effect generating integrated circuit can be used in order to play multiple sounds at one time. After playing any loaded sound effect or effects, the software then branches to section 594.

Figure 20:
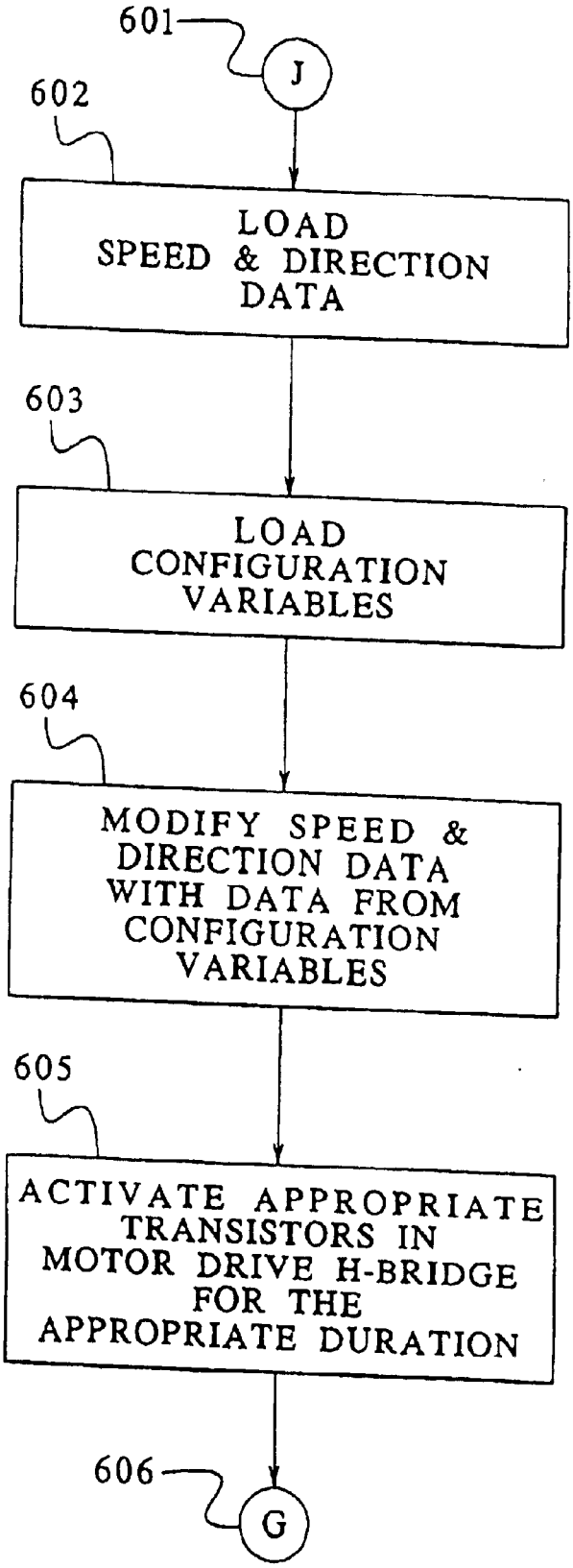

Referring now to FIG. 20 at section 601 where the control of the model train locomotive motor begins, model train locomotives typically contain a multi-pole, permanent magnet, low-voltage motor. In the case of the present invention, pulse width modulation is used to vary the speed and direction of the motor. The previously received speed and direction data is now loaded at section 602. There are several configuration variables which can influence motor characteristics. Some examples of these control variables, but not limited to, can include acceleration, deceleration, start voltages, motor response curves and noise snubbing. These control variables allow an end user to tailor a model locomotive's motor operation characteristics to personal preferences often enhancing the operation of the device. These configuration variables are loaded at section 603. The loaded speed and direction data are now modified with data from the configuration variables at section 604.

Referring now to FIGS. 7A–7C at section 107, MOSFET transistors Q3, Q4, Q5, and Q6 have their gates connected to the micro-controller at section 101 output lines 1–4 at section 105, respectively. If output lines 1 and 2 are brought to a digital "1" state and output lines 3 and 4 are at a digital "0" state, current flows through transistors Q3 and Q4 causing the motor to turn at a speed in proportion to the amount of time that the transistors are switched on. Full speed indicates that the transistors are switched on all the time. If output lines 3 and 4 are brought to a digital "1" state and output lines 1 and 2 are at a digital "0" state, current flows through transistors Q5 and Q6 causing the motor to turn at a speed in proportion to the amount of time that the transistors are switched on in the opposite direction. The controllable filter network helps reduce physical vibrations created in the motor armatures due to the sharp rise time of the pulses. Referring back to FIG. 20, the motor control aspects are contained within section 605. The software branches at section 606 back to FIG. 11 at section 514 to begin receiving a new preamble.

Figure 18:
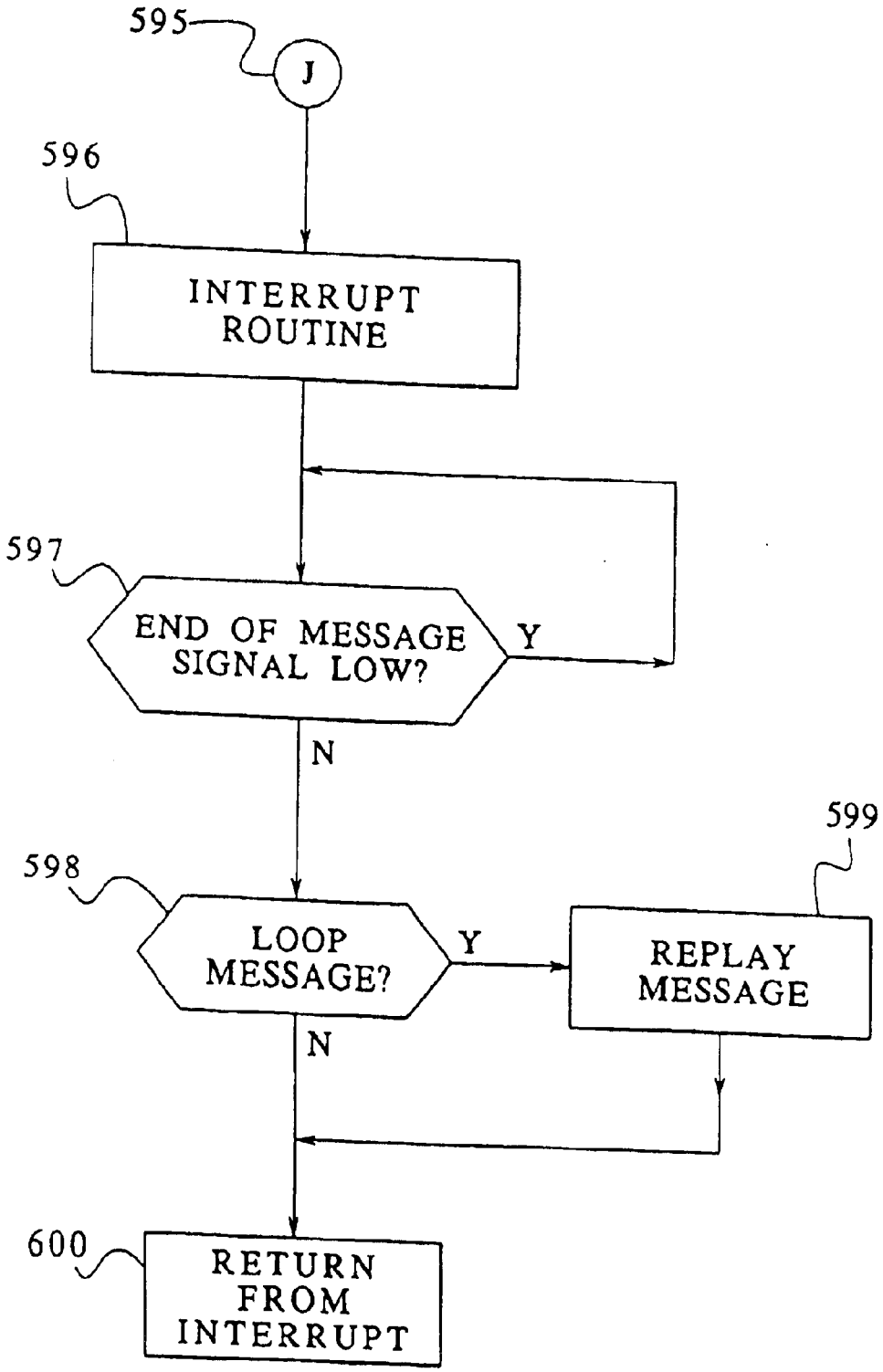

Referring now to FIG. 18 at section 595, this is the entry point for an interrupt routine 596. As the word interrupt implies, there is not a particular branch to this routine. Whenever a sound effect nears the end of playback, a signal is generated. This signal triggers an interrupt and causes an immediate branch to this routine. This signal is then monitored at section 597 until the sound effect has completed playback. Once completed, the sound effect is checked to see if it should be repeated or looped at section 598. If it should be looped, the sound effect is replayed at section 599. Once the sound effect is replayed or allowed to lapse, the software then returns to the point of the original branch at section 600.

Referring now to FIG. 11 at section 513, numerous configuration variables are contained within the present invention. Examples of the configuration variable include programmable device address, volume settings, breakpoints and motor characteristics such as acceleration, deceleration and speed tables. Many of these CV's are defined by the NMRA standards. Others are reserved for uses defined and specified by individual manufacturers. Configuration variables are pre-programmed by the manufacturer with values which would be acceptable to many end users. However, some model train enthusiasts may desire to alter some or all of these configuration variables to enhance operation based upon unique installations. Section 513 checks to see if a received data packet is intended to alter configuration variables. If it is, a branch at section 520 is taken to FIG. 15 at section 545. In section 546, the configuration variable address is extracted. In section 547, the configuration variable able data is written. In section 548, an acknowledgment is issued. An acknowledgment may consist of a motor lurch, a light flash or both. The acknowledgment gives the end user an indication that the programming has been accomplished. The software branches at section 549 back to FIG. 11 at section 514 to begin receiving a new preamble.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A sound reproducing system for a model train traveling on a plurality of rails that uses [a] *an* amplified digital control signal for propulsion and control, the system comprising:

a sound memory storing a plurality of sound effects at predetermined addresses;

a controller connected to the sound memory for recalling the sound effects of either one or a plurality of sound effects in a predetermined sequence or a random sequence;

a sound memory containing multiple samples that emulate a [model] locomotive at various speeds and [work loads] *work-loads*;

an integrated sound, motor and special effects controller controlled by a bi-polar digital signal, the motor and special effects controller [re-producing] *reproducing* the stored sounds contained in the model train; and a digital packet triggering a sound effect for automatic playback of a sound effect.

2. The system according to claim 1 wherein the model train has two rails for providing a digital signal and powering the sound effects of the model train, motor, and special effects system.

3. The system according to claim 1 further comprising:

an electrical power supply in the rail car or track side structure having a means for collecting the digital bi-polar signal from either of the two insulated tracks by a pick up on two insulated wheels or off of a digital buss line or overhead wire;

a full wave bridge rectifier with an input connected to a bi-polar digital signal with an output producing a DC voltage regardless of the phase of the bi-polar signal; *and* a regulated power supply connected to a full wave bridge rectifier supplying power to the sound reproducing system; and a regulated power source for the audio amplifiers.

4. The system according to claim 1 further comprising:

means for simultaneously decoding a properly addressed digital control packet for control of the model locomotive's electric motor, control of the sound functions and [on board] *on-board* special effects.

5. The system of claim 1 further comprising the steps of:

a fixed external source of either AC or DC power and means for connecting a bi-polar digital signal to the sound unit; *and* means for filtering the low level signal noise in the reception of the bi-polar digital signal for power and control of the sound unit.

6. The system of claim 1 further comprising:

means to synchronize sound effects through the use of a Hall effect sensor to trigger a plurality of speed sensitive sounds located in a model train locomotive or rail car based on a digital speed packet wherein the speed sensitive sounds are stored in the memory and include various samples that emulate different speeds and loads; *and* a controller that recalls the same plurality of synchronized sound effects at intervals appropriate to the speed of the locomotive depending on a digital command control speed packet wherein the same controller recalls a plurality of synchronized sound effects at intervals appropriate to the speed of the locomotive using a speed sync sensor and further wherein the controller recalls asynchronous sound effects from the same memory or from additional memories for sound on sound.

7. The system of claim 1 wherein the controller activates an automatic steam release sound effect upon sensing a zero speed packet with the correct address header and further activates an appropriate air compressor sound effect upon sensing the same zero speed packet and correct address header and still further activates lighting effects or other [onboard] *on-board* special effects after receiving and decoding the properly addressed digital control packet.

8. The system of claim 1 further comprising:

a controller that will decode a three byte packet with an [addressed] *address* header that matches the sound unit's discreet address in the range of 1 to 127 addresses for controlling a model train locomotive motor, sound effects and onboard special effects.

9. The system of claim 1 further comprising:

a controller that decodes a four byte packet with an address header that matches the sound [units] *unit's* discreet address in the address range of 1 through 9999 for controlling a model train locomotive motor, sound effects and [onboard] *on-board* special effects.

10. The system of claim 1 further comprising:

means for synchronizing the sound effects to the driver's wheels through decoding a properly addressed digital speed packet that controls the speed of the model locomotive and determines which sound effect to synchronize with the speed of the locomotive using the same digital speed packet.

11. The system of claim 1 further comprising:

a Hall effect sensor to sense a change of speed of wheels of a steam locomotive to trigger the proper speed sound effect by mounting a magnet to the rear of a drive wheel to form a switch closure for synchronization of the sound effect to the digital speed control packet.

12. The system of claim 1 further comprising:

a micro-controller that decodes a predetermined addressed digital signal for control of sound effects, model train propulsion and [on board] *on-board* special effects wherein the micro-controller is operatively connected to the [analog] sound storage of the sound effects wherein the [analog] sound storage has a predetermined set of sounds at specific addresses; and a controller that is connected to special effects outputs that control lighting and other [onboard] *on-board* effects.

13. The system of claim 12 wherein the micro-controller controls the volume of the plurality of sound effects contained in a rail car.

14. The system of claim 12 wherein the micro-controller is configured for changing the break points to control a plurality of sound effects as related to the speed of a model locomotive, using either 14, 28 or 128 steps of speed control resolution using control variables.

15. The system of claim 12 further comprising:

means for changing the break points at which the digital speed packet triggers the related sound effects through end user accessible software on the micro-controller or as defined as configuration variables.

16. The system of claim 1 further comprising:

a plurality of digitized sounds that are controlled by the controller that receives a bi-polar digital signal.

17. The system of claim 1 wherein the enabling means is an internally triggered Hall-effect sensor responding to a change in a magnetic field.

18. The system of claim 1 further comprising:

a magnet; and a pendulum on which the magnet is suspended wherein motion causes the magnet to transpose resulting in a change in the magnetic field.

19. The system of claim 1 further comprising:

a microphone constructed and arranged to record the at least one additional characteristic sound on the sound module means.

20. The system of claim 1 wherein the activation means is a magnetically responsive sensor constructed and arranged near a magnetic field, the magnetic field altered by a magnet.

*21. A sound reproducing system for a model train traveling on a plurality of rails that uses an amplified digital control signal for propulsion and control, the system comprising:*

*a sound unit;*

*a memory within the sound unit wherein the memory stores a plurality of sound effects at addresses wherein the sound effects contain multiple samples that emulate a train locomotive at various conditions; and*

*a controller connected to the memory for recalling at least one of the sound effects wherein the controller is an integrated sound, motor, and special effects controller and further wherein the controller is controlled by a bi-polar digital signal and further wherein the controller recalls the sound effects of either one or the plurality of sound effects in a predetermined sequence or a random sequence by means of the bi-polar digital signal.*

*22. The system of claim 21 wherein the plurality of sound effects are analog.*

*23. The system of claim 21 wherein the plurality of sound effects are digital.*

* * * * *

UNITED STATES PATENT AND TRADEMARK OFFICE

CERTIFICATE OF CORRECTION

PATENT NO. : RE 38,660 E
APPLICATION NO. : 09/592461
DATED : November 23, 2004
INVENTOR(S) : Novosel et al.

It is certified that error appears in the above-identified patent and that said Letters Patent is hereby corrected as shown below:

In Column 1, Line 11-13, replace the first sentence with the following:

U.S. patent application Serial No. 10/911,470 filed on August 3, 2004 claims the benefit of this reissued patent which is a reissue of U.S. Patent No. 5,855,004 issued on December 29, 1998. U.S. Patent No. 5,855,004 is a continuation-in-part of U.S. patent application Serial No. 08/289,257, filed on August 11, 1994, now abandoned.

Signed and Sealed this

Twentieth Day of February, 2007

JON W. DUDAS
*Director of the United States Patent and Trademark Office*

UNITED STATES PATENT AND TRADEMARK OFFICE

CERTIFICATE OF CORRECTION

PATENT NO. : RE 38,660 C1
APPLICATION NO. : 90/008936
DATED : December 1, 2009
INVENTOR(S) : Novosel et al.

It is certified that error appears in the above-identified patent and that said Letters Patent is hereby corrected as shown below:

Title page should be deleted and replace with the attached title page.

On the title page, item (10) Number: should read -- US RE38,660 C1 --

Signed and Sealed this

Twenty-ninth Day of June, 2010

David J. Kappos

David J. Kappos
*Director of the United States Patent and Trademark Office*

(12) EX PARTE REEXAMINATION CERTIFICATE (7195th)

United States Patent

Novosel et al.

(10) Number: US RE38,660 C1 --

(45) Certificate Issued: Dec. 1, 2009

(54) SOUND RECORDING AND REPRODUCTION SYSTEM FOR MODEL TRAIN USING INTEGRATED DIGITAL COMMAND CONTROL

(75) Inventors: Michael J. Novosel, Chicago, IL (US); Kelly Boles, Rochester, MN (US); Vincent S. Fleszewski, III, Crown Point, IN (US)

(73) Assignee: Real Rail Effects, Inc., Chicago, IL (US)

Reexamination Request:
No. 90/008,936, Nov. 20, 2007

Reexamination Certificate for:

| | |
|---|---|
| Patent No.: | **Re. 038,660** |
| Issued: | **Nov. 23, 2004** |
| Appl. No.: | **09/592,461** |
| Filed: | **Jun. 9, 2000** |

Certificate of Correction issued Feb. 20, 2007.

Related U.S. Patent Documents

Reissue of:

| | |
|---|---|
| (64) Patent No.: | **5,855,004** |
| Issued: | **Dec. 29, 1998** |
| Appl. No.: | **08/851,200** |
| Filed: | **May 5, 1997** |

Related U.S. Application Data

(63) Continuation-in-part of application No. 08/289,257, filed on Aug. 11, 1994, now abandoned.

(51) Int. Cl.
*A63H 19/14* (2006.01)
*A63H 19/00* (2006.01)

(52) U.S. Cl. ..... 704/272; 105/1.5; 318/51; 704/201

(58) Field of Classification Search ..... None
See application file for complete search history.

(56) References Cited

U.S. PATENT DOCUMENTS 5,174,216 A 12/1992 Miller
5,448,142 A 9/1995 Severson

OTHER PUBLICATIONS

Throttle Up! SoundTraxx DCC Digital Sound Decoder handout published in Feb. 1996.

Debbie Ames, How compatible is DCC? Field testing a number of digital command control systems, Model Railroader, Oct. 1996.

Rutger Friberg, Magical Voice for Trains, Allt om Hobby, Jun. 1992.

Rutger Friberg, Magical Voice for Trains—part 2, Allt om Hobby, Aug. 1992.

Rutger Friberg, The last section of Magical Voice Module for Trains, Allt om Hobby, Jan. 1993.

(Continued)

*Primary Examiner*—Sharon E Payne

(57) ABSTRACT

A system is provided for recording, storing and reproducing sound for playing back in an environment requiring simulated sounds, voices, and/or sound effects. Sounds are recorded on a chip and played back in an asynchronous manner from the chip as a result of activation of a switch or inertial movement within the system. A Hall-effect sensor, reed switch or momentary switch or the like may be implemented for enabling activation of the recorded sound from the chip for broadcasting. A compander compresses the sound on the chip and expands the compressed sound for playback. Employing the above system for audio storage, a sound, motor and special effects controller may be created for model train applications as well. The different functions of the sound unit are controlled through a discrete bi-polar digital command control signal using a unique address for each unit. A synchronous means of play back may also be employed when the system is used with the bi-polar signal using a sensor. In addition to the analog sound storage, the same concepts and ideas may be applied to a digital sound recording and play back device as well.

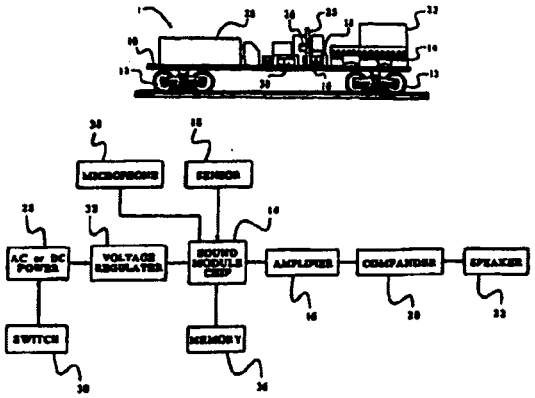

US00RE38660F1

(12) EX PARTE REEXAMINATION CERTIFICATE (7195th)

United States Patent

Novosel et al.

(10) Number: US RE38,660 F1

(45) Certificate Issued: Dec. 1, 2009

(54) SOUND RECORDING AND REPRODUCTION SYSTEM FOR MODEL TRAIN USING INTEGRATED DIGITAL COMMAND CONTROL

(75) Inventors: Michael J. Novosel, Chicago, IL (US); Kelly Boles, Rochester, MN (US); Vincent S. Fleszewski, III, Crown Point, IN (US)

(73) Assignee: Real Rail Effects, Inc., Chicago, IL (US)

Reexamination Request:
No. 90/008,936, Nov. 20, 2007

Reexamination Certificate for:

| | |
|---|---|
| Patent No.: | **Re. 038,660** |
| Issued: | **Nov. 23, 2004** |
| Appl. No.: | **09/592,461** |
| Filed: | **Jun. 9, 2000** |

Certificate of Correction issued Feb. 20, 2007.

Related U.S. Patent Documents

Reissue of:

| | |
|---|---|
| (64) Patent No.: | **5,855,004** |
| Issued: | **Dec. 29, 1998** |
| Appl. No.: | **08/851,200** |
| Filed: | **May 5, 1997** |

Related U.S. Application Data

(63) Continuation-in-part of application No. 08/289,257, filed on Aug. 11, 1994, now abandoned.

(51) Int. Cl.
*A63H 19/14* (2006.01)
*A63H 19/00* (2006.01)

(52) U.S. Cl. ..... 704/272; 105/1.5; 318/51; 704/201

(58) Field of Classification Search ..... None
See application file for complete search history.

(56) References Cited

U.S. PATENT DOCUMENTS 5,174,216 A 12/1992 Miller
5,448,142 A 9/1995 Severson

OTHER PUBLICATIONS

Throttle Up! SoundTraxx DCC Digital Sound Decoder handout published in Feb. 1996.

Debbie Ames, How compatible is DCC? Field testing a number of digital command control systems, Model Railroader, Oct. 1996.

Rutger Friberg, Magical Voice for Trains, Allt om Hobby, Jun. 1992.

Rutger Friberg, Magical Voice for Trains—part 2, Allt om Hobby, Aug. 1992.

Rutger Friberg, The last section of Magical Voice Module for Trains, Allt om Hobby, Jan. 1993.

(Continued)

*Primary Examiner*—Sharon E Payne

(57) ABSTRACT

A system is provided for recording, storing and reproducing sound for playing back in an environment requiring simulated sounds, voices, and/or sound effects. Sounds are recorded on a chip and played back in an asynchronous manner from the chip as a result of activation of a switch or inertial movement within the system. A Hall-effect sensor, reed switch or momentary switch or the like may be implemented for enabling activation of the recorded sound from the chip for broadcasting. A compander compresses the sound on the chip and expands the compressed sound for playback. Employing the above system for audio storage, a sound, motor and special effects controller may be created for model train applications as well. The different functions of the sound unit are controlled through a discrete bi-polar digital command control signal using a unique address for each unit. A synchronous means of play back may also be employed when the system is used with the bi-polar signal using a sensor. In addition to the analog sound storage, the same concepts and ideas may be applied to a digital sound recording and play back device as well.

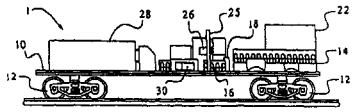

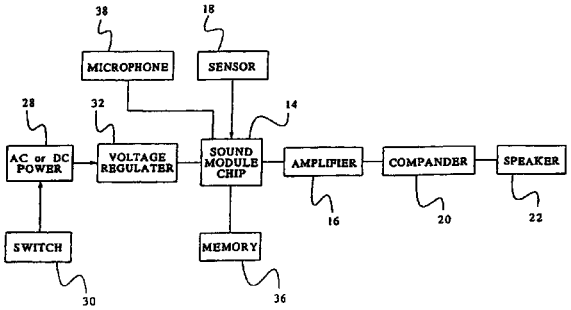

OTHER PUBLICATIONS

Stan Ames, Proposed MNRA Electrical Standard for Command Control: Status Report, The Colombus Clinics 131–141 (NMRA 1992).

Lawrence A. Berardinis, Talkin Track, Machine Design, Mar. 9, 1995.

Larry Puckett, Model Railroading Takes a Closer Look at Digital Command Control. Model Railroading, Oct. 1995.

SoundTraxx Advertisement in Apr. 1996 issue of Model Railroader.

SoundTraxx Advertisement in May 1996 issue of Model Railroader.

Joint Claim Construction Statement.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–23 are determined to be patentable as amended.

1. A sound reproducing system for a model train traveling on a plurality of rails that uses *an* amplified digital control signal for propulsion and control, the system comprising:

a sound memory storing a plurality of sound effects at predetermined addresses;

a controller connected to the sound memory for recalling [[the sound effects of either]] one or more of the [[a]] plurality of sound effects in a predetermined sequence or a random sequence[[:]] wherein the [[a]] sound memory [[containing]] contains multiple samples that emulate a locomotive at various speeds and *work-loads* wherein the multiple samples are stored at the predetermined addresses as the plurality of sound effects;

an integrated sound, motor and special effects controller controlled by a bi-polar digital signal[[.]] wherein the integrated sound, motor and special effects controller controls a speed of the model train and further wherein the integrated sound, motor and special effects controller reproduces the multiple samples; said integrated sound, motor and special effects controller *reproducing* the stored sounds contained in the model train; [[and]]

a sensor that has a rate that indicates a speed of the model train wherein the integrated sound, motor and special effects controller determines a workload of the model train using the sensor;

a digital packet triggering a sound effect for automatic playback of a sound effect; said digital packet provided by the bi-polar digital signal wherein the integrated sound, motor and special effects controller recalls a first sound sample of the multiple samples and further wherein the integrated sound, motor and special effects controller determines a workload of the model train based on comparison of the rate of the sensor to the digital packet wherein the first sound sample is selected from the multiple samples based on the comparison of the rate of the sensor to the digital packet; and a filter network that suppresses audible motor noise.

2. The system according to claim 1 wherein the [[model train has two rails for providing a digital signal and powering the sound effects of the model train, motor, and special effects system]] integrated sound, motor and special effects controller plays a transitional sound sample of the multiple samples and a second sound sample of the multiple samples wherein the transitional sound sample is selected from the multiple samples based on comparison of the first sound sample to the second sound sample.

3. The system according to claim 1 further comprising:

an electrical power supply [[in the rail car or track side structure having]] connected to the integrated sound, motor and special effects controller wherein the electrical power supply has a means for collecting the digital bi-polar signal from either of [[the]] two insulated tracks by a pick up on two insulated wheels or off of a digital buss line or overhead wire;

a full wave bridge rectifier with an input connected to [[a]] the bi-polar digital signal with an output producing a DC voltage regardless of the phase of the bi-polar signal; [[*and*]]

a regulated power supply connected to [[a]] the full wave bridge rectifier supplying power to the sound reproducing system; and a regulated power source for [[the]] audio amplifiers.

4. The system according to claim 1 further comprising:

means for simultaneously decoding a properly addressed digital control packet for control of [[the model locomotive's]] an electric motor[[,]] of the model train and control of [[the]] sound functions and *on-board* special effects of the model train wherein the filter network is a controllable filter network.

5. The system of claim 1 [[further comprising the steps of: a fixed external source of either AC or DC power and means for connecting a bi-polar digital signal to the sound unit; *and* means for filtering the low level signal noise in the reception of the bi-polar digital signal for power and control of the sound unit]] wherein the filter network is a controllable filter network for motor noise snubbing connected to an electric motor wherein the controllable filter network is controlled by user input of configuration variables or motor control speed that select an attenuation of the filter network.

6. The system of claim 1 [[further comprising: means to synchronize sound effects through the use of]] wherein the sensor is a Hall effect sensor [[to trigger a plurality of speed sensitive sounds located in a model train locomotive or rail car based on a digital speed packet wherein the speed sensitive sounds are stored in the memory and include various samples that emulate different speeds and loads; *and* a]]connected to the integrated sound, motor and special effects controller wherein the Hall effect sensor detects a change in magnetic field that indicates the speed of the model train wherein the integrated sound, motor and special effects controller [[that]] recalls the [[same plurality of synchronized sound effects]] first sound sample and a second sound sample at intervals appropriate to the speed of the [[locomotive depending on a digital command control speed packet wherein the same controller recalls a plurality of synchronized sound effects at intervals appropriate to the speed of the locomotive using a speed sync sensor and further wherein the controller recalls asynchronous sound effects from the same memory or from an additional memories for sound on sound]] model train wherein the intervals are determined by the workload.

7. The system of claim 1 wherein the integrated sound, motor and special effects controller activates an automatic steam release sound effect upon sensing an error condition or a zero speed packet with [[the]] a correct address header and further activates an appropriate air compressor sound effect upon sensing the same error condition or the same zero speed packet and the correct address header and still further activates lighting effects or other *on-board* special effects after annunciating the error condition or receiving and decoding the [[properly addressed digital control]] zero speed packet.

8. The system of claim 1 [[further comprising: a]] wherein the integrated sound, motor and special effects controller [[that will decode]] decodes a three byte packet with an *address* header that matches [[the sound unit's]] a discreet address of the predetermined addresses in [[the]] a range of 1 to 127 addresses for controlling a model train locomotive motor, sound effects and onboard special effects.

9. The system of claim 1 [[further comprising: a]] wherein the integrated sound, motor and special effects controller [[that]] decodes a four byte packet with an address header that matches [[the sound *unit's*]] a discreet address of the predetermined addresses in [[the]] an address range of 1 through 9999 for controlling a model train locomotive motor, sound effects and *on-board* special effects.

10. The system of claim 1 further comprising:

means for synchronizing play of the [[sound effects]] multiple samples to [[the driver's]] wheels of the model train through decoding [[a properly addressed]] the digital [[speed]] packet [[that controls the speed of the model locomotive]] and [[determines]] determination of which sound [[effect]] of the multple sound samples to synchronize with the speed of the [[locomotive]] model train using the same digital [[speed]] packet.

11. The system of claim 1 [[further comprising:]] wherein the sensor is a Hall effect sensor [[to sense]] that detects a change of speed of wheels of [[a steam locomotive to trigger the]] the model train and further wherein the change in the speed of the wheels triggers a proper speed sound effect [[by mounting]] of the multiple samples wherein the Hall effect sensor detects the change of the speed of the wheels using a magnet [[to the rear of a drive wheel]] attached to one of the wheels to form a switch closure for synchronization of the proper speed sound effect to the digital [[speed control]] packet.

12. The system of claim 1 further comprising:

a micro-controller that decodes [[a predetermined addressed]] the bi-polar digital signal for control of sound effects, model train propulsion and *on-board* special effects wherein the micro-controller is operatively connected to the sound [[storage of the sound effects wherein the sound storage has a predetermined set of sounds at specific addresses;]] memory and [[a]] further wherein the integrated sound, motor and special effects controller [[that]] is operatively connected to the sensor and special effects outputs that control lighting and other *on-board* effects.

13. The system of claim 12 wherein the micro-controller controls [[the]] a volume of the [[plurality of sound effects contained in a rail car]] multiple samples.

14. The system of claim 12 wherein the micro-controller is configured for changing [[the]] break points to control [[a plurality of sound effects as related]] play of the multiple samples synchronous or asynchronous to [[the]] a speed of [[a]] the model [[locomotive,]] train using either 14, 28 or 128 steps of speed control resolution using control variables.

15. The system of claim 12 further comprising:

means for changing [[the]] break points at which the digital [[speed]] packet triggers play of the [[related sound effects]] multiple samples through end user accessible software [[on]] executed by the micro-controller or as defined as configuration variables.

16. The system of claim 1 further comprising:

a [[plurality of digitized sounds that are controlled by the controller that receives a bi-polar digital signal]] LED that indicates the acquisition of the bi-polar digital signal.

17. The system of claim 1 wherein [[the enabling means is an internally triggered Hall-effect sensor responding to a change in a magnetic field]] the first sound sample of the multiple samples is a sound effect recorded at a first train speed and further wherein the second sound sample of the multiple samples is the sound effect recorded at a second train speed wherein the first sound sample and the second sound sample are different and further wherein the first train speed and the second train speed are different.

18. The system of claim 1 further comprising:

a magnet; and a pendulum on which the magnet is suspended wherein motion causes the magnet to transpose resulting in a change in [[the]] a magnetic field.

19. The system of claim 1 further comprising:

a microphone constructed and arranged for a user to record [[the at least one]] an additional characteristic sound stored on the sound [[module means]] memory after the multiple samples are stored at the predetermined addresses.

20. The system of claim 1 wherein the [[activation means]] sensor is a magnetically responsive sensor constructed and arranged near a magnetic field[[.]] wherein the magnetic field is altered [[by a magnet]].

*21. A sound reproducing system for a model train traveling on a plurality of rails that uses an amplified digital control signal for propulsion and control, the system comprising:*

*a sound unit;*

*a memory within the sound unit wherein the memory stores a plurality of sound effects at* predetermined *addresses wherein the sound effects contain multiple* sound *samples that emulate a train locomotive at various conditions* and further wherein a first sound sample of the plurality of sound samples is a sound effect recorded at a first train locomotive condition and further wherein a second sound sample of the plurality of sound samples is the sound effect recorded at a second train locomotive condition wherein the first sound sample and the second sound sample are different and further wherein the first train locomotive condition and the second train locomotive condition are different; [[and]]

*a controller connected to the memory for recalling at least one of the sound effects wherein the controller is an integrated sound, motor, and special effects controller and further wherein the controller is controlled by a bi-polar digital signal and further wherein the controller recalls* [[*the sound effects of either*]] *one or* more of *the plurality of sound effects in a predetermined sequence or a random sequence by means of the bi-polar digital signal;* a sensor that has a rate that corresponds to a speed of the model train; and a digital speed packet provided by the amplified digital control signal wherein the controller determines a workload of the model train based on comparison of the rate of the sensor to the digital packet and further wherein the controller recalls the first sound sample and the second sound sample based on the comparison of the rate of the sensor to the digital packet.

*22. The system of claim 21 wherein the* [[*plurality of sound effects are analog*]] sound effect is a sound of a steam or diesel locomotive and further wherein the first sound sample is the sound at a first train speed wherein the second sound sample is the sound at a second train speed.

*23. The system of claim 21 wherein* [[*the plurality of sound effects are digital*]] a time interval between play of the first sound sample and the second sound sample is determined by the controller based on the workload.

* * * * *